US012489688B1

(12) United States Patent
Miriyala et al.

(10) Patent No.: US 12,489,688 B1
(45) Date of Patent: *Dec. 2, 2025

(54) INTER-APPLICATION WORKLOAD NETWORK TRAFFIC MONITORING AND VISUALIZATION

(71) Applicant: Juniper Networks, Inc., Sunnyvale, CA (US)

(72) Inventors: Prasad Miriyala, San Jose, CA (US); Anish Mehta, Fremont, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/171,239

(22) Filed: Feb. 17, 2023

Related U.S. Application Data

(63) Continuation of application No. 17/449,640, filed on Sep. 30, 2021, now Pat. No. 11,588,708, which is a
(Continued)

(51) Int. Cl.
*H04L 41/22* (2022.01)
*G06F 3/04842* (2022.01)
(Continued)

(52) U.S. Cl.
CPC .............. *H04L 41/22* (2013.01); *G06F 9/451* (2018.02); *H04L 41/12* (2013.01); *H04L 41/142* (2013.01); *G06F 3/04842* (2013.01)

(58) Field of Classification Search
None
See application file for complete search history.

(56) References Cited

U.S. PATENT DOCUMENTS

| D614,192 S | 4/2010 | Takano et al. |
| 8,416,198 B2 | 4/2013 | Rathnam et al. |
| (Continued) | | |

FOREIGN PATENT DOCUMENTS

WO 2013/184846 A1 12/2013

OTHER PUBLICATIONS

"IEEE Standard for Local and Metropolitan Area Networks, IEEE Std 802.1ag™-2007—Virtual Bridged Local Area Networks—Amendment 5: Connectivity Fault Management," IEEE Computer Society, LAN/MAN Standards Committee, Dec. 7, 2007, 260 pp.
(Continued)

*Primary Examiner* — William L Bashore
*Assistant Examiner* — Koorosh Nehchiri
(74) *Attorney, Agent, or Firm* — Shumaker & Sieffert, P.A.

(57) ABSTRACT

Graphical user interfaces are generated that, when displayed, provide a visual and interactive representation of one or more aspects associated with the execution of one or more applications on a computer network. The graphical user interfaces may in include graphical depictions representation policy objects, each policy object assigned one or more tags, each tag assigned to a category or a sub-category. The tags, when taken in combination, may identify an application, and one or more other characteristics associated with each of the policy objects. The graphical elements representing the policy objects may be displayed in the graphical user interfaces so that the policy objects assigned to tags in a category are positioned in an outer ring, and policy objects assigned to sub-category tags are positioned in a inner ring surrounded by the outer ring, with interconnection elements representing communications between policy objects extending within an interior area.

20 Claims, 16 Drawing Sheets

Related U.S. Application Data continuation of application No. 16/022,464, filed on Jun. 28, 2018, now Pat. No. 11,159,389.

(51) Int. Cl.
    *G06F 9/451*     (2018.01)
    *H04L 41/12*     (2022.01)
    *H04L 41/142*     (2022.01)

(56) References Cited

U.S. PATENT DOCUMENTS

| | | | |
|---|---|---|---|
| D697,080 S | 1/2014 | Scholz et al. | |
| D699,251 S | 2/2014 | Rao et al. | |
| D733,167 S | 6/2015 | Schoger et al. | |
| D743,412 S | 11/2015 | Danielyan et al. | |
| D743,423 S | 11/2015 | Danielyan et al. | |
| D763,877 S | 8/2016 | Yu | |
| D786,273 S | 5/2017 | Herman et al. | |
| 9,641,435 B1 | 5/2017 | Sivaramakrishnan | |
| 9,729,414 B1 | 8/2017 | Oliveira et al. | |
| D806,120 S | 12/2017 | Elatta | |
| D813,884 S | 3/2018 | Penker | |
| 9,934,269 B1 | 4/2018 | Kahrs et al. | |
| 9,940,739 B2 * | 4/2018 | Bynoe | G06Q 10/00 |
| 10,042,920 B2 | 8/2018 | Herman et al. | |
| 10,142,353 B2 * | 11/2018 | Yadav | H04L 63/0227 |
| D838,734 S | 1/2019 | Kruse et al. | |
| 10,180,768 B1 | 1/2019 | Capano | |
| 10,291,497 B2 | 5/2019 | Mehta et al. | |
| D852,821 S | 7/2019 | Anderson et al. | |
| D854,561 S | 7/2019 | Field et al. | |
| 10,382,331 B1 | 8/2019 | Sivaramakrishnan | |
| D858,540 S | 9/2019 | Lian et al. | |
| 10,496,692 B1 | 12/2019 | Kahrs et al. | |
| D877,753 S | 3/2020 | Chitalia et al. | |
| D878,407 S | 3/2020 | Miriyala et al. | |
| 10,742,690 B2 | 8/2020 | Miriyala et al. | |
| D931,315 S | 9/2021 | Miriyala et al. | |
| D931,316 S | 9/2021 | Miriyala et al. | |
| 11,159,389 B1 | 10/2021 | Miriyala et al. | |
| 11,323,487 B1 | 5/2022 | Miriyala et al. | |
| 11,588,708 B1 | 2/2023 | Miriyala et al. | |
| 2008/0270199 A1 | 10/2008 | Chess et al. | |
| 2009/0313625 A1 | 12/2009 | Sharoff et al. | |
| 2010/0293270 A1 * | 11/2010 | Augenstein | G06F 11/3466 |
| | | | 709/224 |
| 2011/0231899 A1 | 9/2011 | Pulier et al. | |
| 2012/0185913 A1 | 7/2012 | Martinez et al. | |
| 2012/0204187 A1 * | 8/2012 | Breiter | G06F 9/5072 |
| | | | 718/105 |
| 2012/0209992 A1 | 8/2012 | Albaugh et al. | |
| 2013/0019175 A1 | 1/2013 | Kotler et al. | |
| 2013/0212576 A1 | 8/2013 | Huang et al. | |
| 2014/0075005 A1 | 3/2014 | Tung et al. | |
| 2015/0156077 A1 | 6/2015 | Gao et al. | |
| 2015/0350103 A1 | 12/2015 | Bertram et al. | |
| 2015/0358391 A1 * | 12/2015 | Moon | H04L 67/10 |
| | | | 709/224 |
| 2016/0011925 A1 | 1/2016 | Kulkarni et al. | |
| 2016/0072815 A1 * | 3/2016 | Rieke | H04L 63/101 |
| | | | 726/3 |
| 2016/0299061 A1 | 10/2016 | Goldring et al. | |
| 2016/0337204 A1 * | 11/2016 | Dubey | G06F 3/04847 |
| 2016/0359915 A1 * | 12/2016 | Gupta | H04L 43/04 |
| 2018/0341394 A1 * | 11/2018 | Sangli | H04L 67/1097 |
| 2019/0034504 A1 | 1/2019 | Berwick et al. | |

OTHER PUBLICATIONS

"Series Y: Global Information Infrastructure, Internet Protocol Aspects and Next-Generation Networks, Internet protocol aspects—Operation, administration and maintenance," Y.1731, ITU-T Telecommunication Standardization Sector of ITU, May 2006, 80 pp.

Hopps, "Analysis of an Equal-Cost Multi-Path Algorithm," RFC 2992, Network Working Group, Nov. 2000, 8 pp.

Prosecution History from U.S. Appl. No. 16/022,464, dated Jan. 27, 2020 through Sep. 28, 2021, 188 pp.

Prosecution History from U.S. Appl. No. 17/449,640, dated Jul. 6, 2022 through Jan. 20, 2023, 22 pp.

Sajassi et al., "BGP MPLS-Based Ethernet VPN," RFC 7432, Internet Engineering Task Force (IETF), Feb. 2015, 56 pp.

* cited by examiner

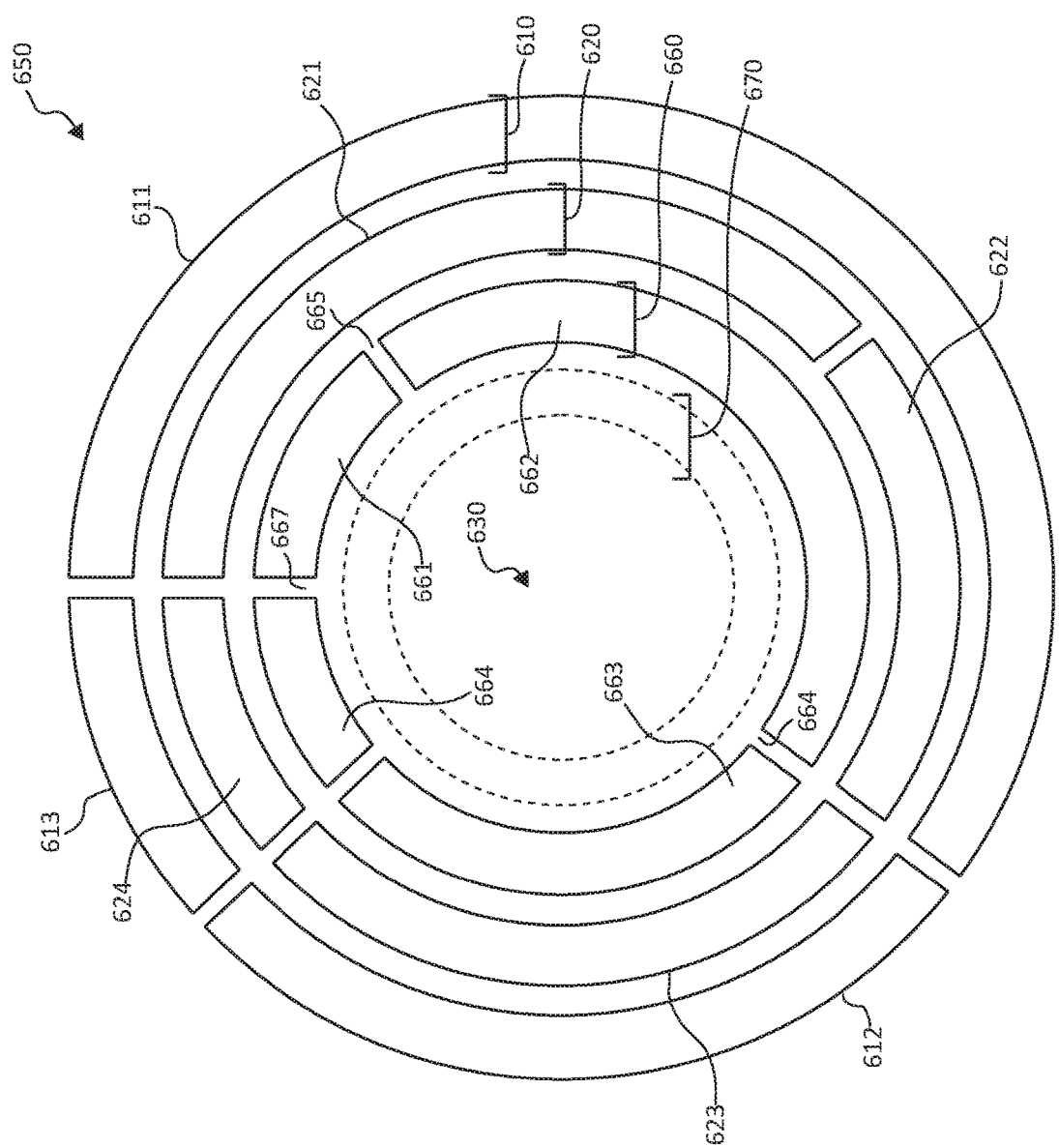

INTER-APPLICATION WORKLOAD NETWORK TRAFFIC MONITORING AND VISUALIZATION

This application is a continuation of U.S. patent application Ser. No. 17/449,640, filed 30 Sep. 2021, which is a continuation of U.S. patent application Ser. No. 16/022,464, filed 28 Jun. 2018, the entire content of each application being incorporated herein by reference.

TECHNICAL FIELD

The disclosure relates to visualization of various aspects related to applications operating in a cloud data centers and/or on computer network(s) and, more particularly, to the generation and display of graphical user interfaces for visualization of these various aspects related to the operations of the applications in the data centers and/or in the computer network(s).

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices. Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

The data center may, for example, physically house all of the infrastructure equipment, such as networking and storage systems, redundant power supplies, and environmental controls. In a typical data center, clusters of storage systems and application servers are interconnected via a switch fabric provided by one or more tiers of physical network switches and routers. More sophisticated data centers provide infrastructure spread throughout the world with subscriber support equipment located in various physical hosting facilities. In many examples of data centers, the infrastructure may include a combination of the physical devices, which may be referred to as the "underlay resources," that are linked to and communicate with a variety of virtual resources such as virtual servers, agents, and/or policy controllers, which may be referred to as "overlay resources."

SUMMARY

This disclosure describes techniques for decentralized monitoring of network traffic being exchanged among application workloads and for generating a user interface illustrating inter-application workload communications between different application workloads for one or more applications. As described herein, a security policy may establish rules for communications between workloads of one or more applications executing within a virtualization infrastructure. A computing device may generate graphical user interfaces that provide visual representations of the application, by one or more policy agents distributed in the virtualization infrastructure, of the security policy rules and of communications (or lack thereof) among the various workloads.

A distributed application may execute on a virtualization as one or more application workloads. A workload being executed in support of an application may be assigned one or more tags that define identify the workload within one or more categories. A workload may be associated with one or more pre-defined tags and/or one or more custom tags as a result of assignment of such tags to the workload itself or to some aspect of an execution environment on which the workload is executing. The pre-defined tags may fall into labeled categories, each category corresponding to a particular parameter or aspect of the application. For example, a set of pre-defined tags may be labeled for identifying workloads according to the categories Application, Tier, Site, and Development. An Application tag may have a value identifying an application that a particular workload supports. A Tier tag may have a value identifying an application tier that the workload is performing on or within, for example a web tier or a database tier. A Site tag may have a value identifying a site, such as a physical location, where the workload is running. A Development tag may have a value identifying an operational mode or developmental stage of a version of application, such as a developmental, staging, or production version of the application that the workload is running. Any other additional tag or tags, such as a custom tag, may be associated with the workload to further define the workload. The tags, when taken in combination, may provide a unique identity for a given application workload, and such tags may provide additional information related to any of a variety of aspects associated with the workload.

A user may define requirements for modeling a set of application workloads as categories at a top level, and sub-categories at a secondary level. A category may be defined as including one tag, such as the "Application" tag, or may be defined to include combination of tags, such as the "Application" and "Tier" tags. Sub-categories may be defined to include other tags, such as "Site" and "Development" tags. A graphical user interface providing a visualization of workloads and the application of policy rules to workload communications may include an outer ring of segments representing application workload(s) being depicted by the visualization. Individual segments of the outer ring may represent different workloads, each segment labeled to show the name or value associated with the tags defined for workloads at the category level. For example, each segment may be labeled in the graphical user interface to illustrate a current name or value associated with the Application tag and the Tier tag assigned to the particular workload.

In some examples, at least one inner ring of segments may be provided inside the outer ring as part of the graphical user interface. Each segment of the inner ring (or multiple inner rings in some examples) is positioned to align with a same workload associated with the corresponding segment of the outer ring. The segments of an inner ring may each be labeled to show a name or a value associated with the tag or tags defined for the sub-category defined for that inner ring and that particular segment. For example, each segment of the inner ring (or rings) may be labeled in the graphical user interface to show a current name or a value associated with the Site tag and the Development tag when these tags are defined as the tags associated with the inner ring.

The visualization of the categories and sub-categories is not limited to examples having an outer ring and a single inner ring, and the number of inner rings may vary depending for example on the way in which the various tags associated with the workloads are defined. For example, custom tags may be assigned a sub-category and defined to be shown in a graphical user interface as a second inner ring in an example of a graphical user interface generated according to any of the techniques described in this disclosure.

Communications between the workloads, represented by one or more segments of the outer most ring and/or the one or more segments of the inner most ring or rings, may be shown in the graphical user interface as interconnection elements. The interconnection elements may include a bar shape or other shapes, such as a line having a thickness in the form of an elongated hour-glass shape. Each of the interconnection elements may extend between a first one of the segments included in the inner ring and a second one of the segments of the inner ring being illustrated in the graphical user interface. The interconnection elements may include one or graphical symbols, such as arrows, that show a direction for indicating a direction of the communications, including one-directional and bi-directional communications, occurring or set up to occur between the segments of the inner ring that the interconnection element extends between. An interconnection element may have a color, pattern, or other visual indication of the result of a policy rule applied to communications between the two workloads associated with the interconnection element. For example, the visual indication may indicate whether traffic was permitted or denied, compliant, or implicitly denied.

In some examples, user inputs may be received by the computing device that define filters to be applied to the graphical using interface being displayed. For example, user inputs may be received that indicate which tags are to be included in the graphical user interface and/or which tags are not to be displayed (filtered out) as part of the graphical user interface being provided. The computing device generating the graphical user interface may be configured to include segments as part of the graphical user interface that correspond to the categories and sub-categories having tags specified for display by the user inputs. In addition, user inputs may be received by the computing device that cause additional information, such as additional text information, to be displayed as part of the graphical user interface. For example, a user input indicating the selection of a particular segment being displayed as part of a graphical user interface may cause the computing device to generate and provide for display a pop-up text box that includes graphical symbols and/or text associated with current and/or historical information associated with the selected segment. A user input indicative of selection of a particular interconnection element being displayed as part of a graphical user interface may cause the computing device to generate and provide for display a pop-up text bot the includes graphical symbols and/or text associated with current and/or historical information associated with the communications being represented by the selected interconnection element. In addition, one or more aspect so the workloads being depicted by the graphical user interfaces as described herein may be represented by the use of various colors associated with the segments and/or other graphic depictions provide as part of the graphical user interface. For example, if communication rates between a given pair of workloads represented by segments in the graphical user interface falls below a pre-defined threshold value, the interconnection element used to illustrate that particular communication may be rendered in a certain color, such as red, or for example may be animated to flash on and off, to draw visual attention to the particular condition being illustrated by the particular portion of the graphical user interface.

The techniques may provide one or more technical advantages. For example, a graphical user interface generated according to this disclosure may provide a robust, comprehensive, and compact representation of the results of the application of security policy rules to virtualization infrastructure operators, application developers, security specialists, or other users. The multi-ring structure generated as part of the graphical user interface may present multi-dimensionally tagged workloads in a hierarchical manner while simultaneously facilitating the representation of communications between such workloads (illustrated as segments). Visual indications such as thickness, color and/or animation of interconnection elements may further provide univariant or multivariate information regarding a particular inter-workload traffic flow (or denial thereof) to a user viewing the graphical user interface in a compact, efficient, and easy to visualize format.

In some examples, the computing device may generate a graphical user interface that includes a two-dimensional grid having elements arranged in rows and columns. Each element of the two-dimensional grid, when selected based on a received user input, is configured to display additional status information related to one or more parameters associated with the communications between various policy objects being represented in the graphical user interface. User inputs provided to the computing device may allow a user to drill down into more specific information associated with a particular policy object and/or a specific communication channel occurring between specific policy object. User inputs to the computing device may also allow toggling of the display being provided by the graphical user interface between the graphical presentation of the segments arranged in one or more rings and the two-dimensional grid having element arranged in rows and columns, allowing for viewing of information in a format that may be most beneficial to a user, such as a technician, based on what the user is interested in monitoring or is troubleshooting the computer system for.

As one example, the disclosure is directed to a method comprising: obtaining, by a computing device for monitoring a virtualized infrastructure, data indicating communications among a plurality of workloads for one or more applications, wherein each of the workloads is executed by the virtualized infrastructure, wherein each of the workloads is associated with a corresponding category from one or more categories for the one or more applications and with a corresponding sub-category from one or more sub-categories for the one or more applications; generating, by the computing device, a graphical user interface that includes: a first set of graphical elements arranged to form an outer ring, a second set of graphical elements arranged to form an inner ring within a space encircled by the outer ring, and one or more interconnection elements, wherein each graphical element in the first set of graphical elements indicates a category from the one or more categories, wherein each graphical element in the second set of graphical elements indicates a sub-category from the one or more sub-categories, and wherein each one of the interconnection elements visually ties a first graphical element of the second set of graphical elements to a second graphical element of the second set of graphical elements and indicates a status of communications between a different pair of workloads of the plurality of workloads; and outputting, by the computing device, the graphical user interface for display at a display device.

In another example, the disclosure is directed to a system comprising: a computing device for monitoring a virtualization infrastructure of a computer network, the computer network comprising a plurality of servers communicatively coupled by a plurality of network devices comprising a switch fabric and one or more agents configured to execute within corresponding servers of the computer network, wherein each of the servers is configured to execute one or more applications associated with a policy; wherein the computing device is configured to: obtain a virtualized infrastructure, data indicating communications among a plurality of workloads for one or more applications, wherein each of the workloads is executed by the virtualized infrastructure, wherein each of the workloads is associated with a corresponding category from one or more categories for the one or more applications and with a corresponding sub-category from one or more sub-categories for the one or more applications; generate a first set of graphical elements arranged to form an outer ring, a second set of graphical elements arranged to form an inner ring within a space encircled by the outer ring, and one or more interconnection elements, wherein each graphical element in the first set of graphical elements indicates a category from the one or more categories, wherein each graphical element in the second set of graphical elements indicates a sub-category from the one or more sub-categories, and wherein each one of the interconnection elements visually ties a first graphical element of the second set of graphical elements to a second graphical element of the second set of graphical elements and indicates a status of communications between a different pair of workloads of the plurality of workloads; and output the graphical user interface for display at a display device.

As another example, the disclosure is directed to a non-transitory computer readable medium storing instructions, that when executed by a computing device comprising processing circuitry execute a method comprising: obtaining data indicating communications among a plurality of workloads for one or more applications, wherein each of the workloads is executed by the virtualized infrastructure, wherein each of the workloads is associated with a corresponding category from one or more categories for the one or more applications and with a corresponding sub-category from one or more sub-categories for the one or more applications; generating a graphical user interface that includes: a first set of graphical elements arranged to form an outer ring, a second set of graphical elements arranged to form an inner ring within a space encircled by the outer ring, and one or more interconnection elements, wherein each graphical element in the first set of graphical elements indicates a category from the one or more categories, wherein each graphical element in the second set of graphical elements indicates a sub-category from the one or more sub-categories, and wherein each one of the interconnection elements visually ties a first graphical element of the second set of graphical elements to a second graphical element of the second set of graphical elements and indicates a status of communications between a different pair of workloads of the plurality of workloads; and outputting the graphical user interface for display at a display device.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIG. 6B illustrates another example graphical user interface that may be used by a computing device for generating graphical user interfaces, in accordance with one or more aspects of the present disclosure.

The drawings and the description provided herein illustrate and describe various examples of the inventive methods, devices, and systems of the present disclosure. However, the methods, devices, and systems of the present disclosure are not limited to the specific examples as illustrated and described herein, and other examples and variations of the methods, devices, and systems of the present disclosure, as would be understood by one of ordinary skill in the art, are contemplated as being within the scope of the present application.

DETAILED DESCRIPTION

Figure 1:
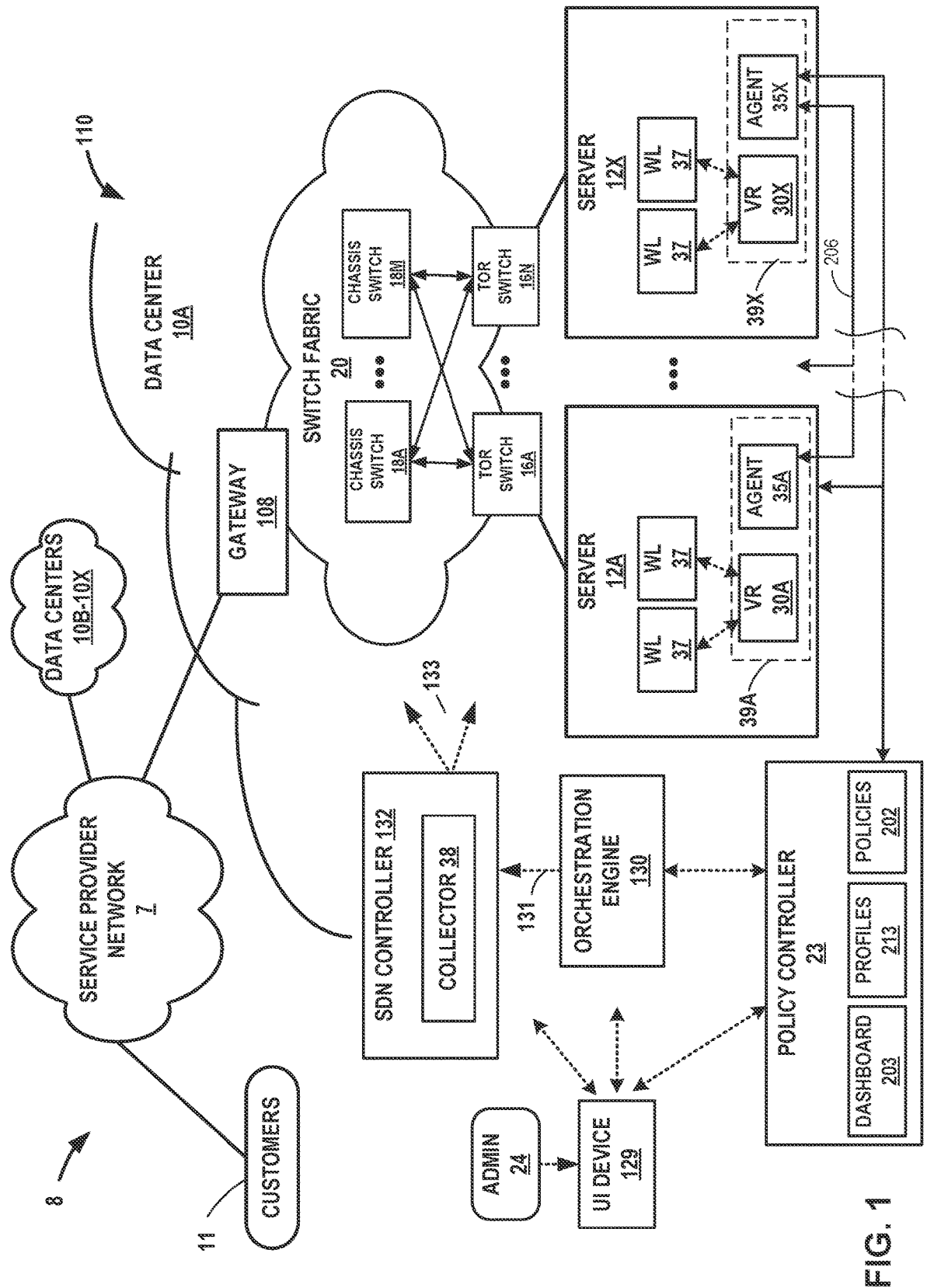
FIG. 1 is a block diagram illustrating an example computer network system in which examples of the techniques described herein may be implemented.

FIG. 1 is a block diagram illustrating an example computer network system 8 in which examples of the techniques described herein may be implemented. Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more workloads 37 (indicated as "WL" in FIG. 1). Workloads 37 may execute on a virtualized environment, such as a virtual machine, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines, containers, or other virtual execution environment for running one or more services (such as virtualized network functions (VNFs)).

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7.

Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39") that performs data forwarding and traffic statistics functions for workflows ("WFs 37" of FIG. 1) executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X of forwarding component 39 executes multiple routing instances for corresponding virtual networks within data center 10 and routes the packets to appropriate virtual machines executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router of a forwarding component executing on one of servers 12 may receive inbound tunnel packets of a packet flow from TOR switches 16 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 12 are described in U.S. patent application Ser. No. 14/228,844, filed Mar. 28, 2014 and entitled "PACKET SEGMENTATION OFFLOAD FOR VIRTUAL NETWORKS," incorporated herein by reference.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

According to the techniques of the disclosure, system 8 performs session-based sampling and logging of network flow and traffic statistics. Virtual routers 42 of forwarding components 39 perform routing services for one or more virtual network functions executing on virtual machines 48 of services 26, such as forwarding network traffic between an originator of the network traffic and a destination for the network traffic. Virtual routers 42 processes both ingress and egress flows of network traffic forwarded by each virtual router 42 to generate network flow statistics. The network flow statistics may include metrics such as bandwidth consumption, traffic routing and pathing, and application use.

Each virtual router 42 communicates the network flow statistics to a corresponding VR agent 36 of forwarding component 39. Each VR agent 36 processes the network flow statistics for the ingress flows and egress flows to identify pairs of the ingress and egress flows corresponding to a common communication session between workflows 37. For each identified pair, VR agent 42 generates session-based records of traffic statistics for the network traffic forwarded by virtual router 42. VR agent 42 uploads the session-based records, along with tag information for a given flow, to traffic collector 38 of SDN controller 32 for cloud data center 10. Traffic collector 38 receives session-based records from a plurality of VR agents 42 and stores these session-based records in analytics database 35 for use by an administrator 24 of cloud data center 10. User interface device 129 may access such metrics via an interface and generate a user interface to assist administrator 24 in detecting and diagnosing network performance issues of the cloud data center.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP)

connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

Virtual routers (virtual router 30A to virtual router 30X, collectively "virtual routers 30" in FIG. 1) execute multiple routing instances for corresponding virtual networks within data center 10A and routes the packets to appropriate workload 37 executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 12 may receive inbound tunnel packets of a packet flow from one or more TOR switches 16 within switch fabric 20 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 12 are described in U.S. patent application Ser. No. 14/228,844, entitled "PACKET SEGMENTATION OFFLOAD FOR VIRTUAL NETWORKS," incorporated herein by reference in its entirety.

In some example implementations, virtual routers 30 executing on servers 12 steer received inbound tunnel packets among multiple processor cores to facilitate packet processing load balancing among the cores when processing the packets for routing to one or more virtual and/or physical machines. As one example, server 12A includes multiple network interface cards and multiple processor cores to execute virtual router 30A, and steers received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offload flows to one or more other processor cores, in accordance with a hash function applied to at least one of the inner and outer packet headers, for processing to take advantage of available work cycles of the other processor cores.

In the example of FIG. 1, data center 10A further includes a policy controller 23 that provides monitoring, scheduling, and performance management for data center 10A. Policy controller 23 interacts with policy agents 35A-35X (collectively "policy agents 35" or "agents 35"), which are deployed within at least some of the respective physical servers 12 for monitoring resource usage of the physical compute nodes as well as any virtualized host, such as WL 37, executing on the physical host. In this way, policy agents 35 provide distributed mechanisms for collecting a wide variety of usage metrics as well as for local enforcement of policies installed by policy controller 23. In example implementations, policy agents 35 run on the lowest level "compute nodes" of the infrastructure of data center 10A that provide computational resources to execute application workloads. A compute node may, for example, be a bare-metal host of server 12, a workload 37, a container or the like.

In addition, each agent within one of servers 12A-12X may be communicatively coupled to other policy agents located in the same server or in a different server. The policy agents may be configured to issue a communication "ping," also referred to as a "communication probe" or simply a "probe," to one or more different policy agents. The communication link between the policy agents is illustratively shown as line 206 in FIG. 1. The policy agent issuing the probe may direct the probe to another policy agent, for example a policy agent in a different server. The probe may be configured to be routed through the same devices within the switch fabric 20 that would be used for regular communications between the servers, for example the TOR switches 16 and chassis switches 18 of the switch fabric. The policy agent issuing the probe or probes may monitor and collect results related to responses, or lack thereof, received in reply to the issued probes. For example, a probe may not return, indicating non-connectivity between the server hosting the policy agent issuing the probe and the server hosting the policy agent that is a destination for the probe. A probe may return after a time, indicating a round-trip time (two-way latency). In some cases, a probe expected to be received by the policy agent that is a destination for the expected probe is not received within an expected time frame, indicating non-connectivity between the server hosting the policy agent issuing the probe and the server hosting the policy agent that is a destination for the probe. In some cases, policy agents may use the probes to determine one-way trip times between servers (latency). The monitored and collected results may include non-connectivity, round-trip times, and latencies among the servers.

Communication probes may conform to various protocols, such as Internet Configuration Management Protocol (ICMP), Transmission Control Protocol (TCP), User Datagram Protocol (UDP), and Hypertext Transfer Protocol (HTTP). For example, an issued probe may be an ICMP Echo Request message (also known as a Ping) or TCP SYN packet, while a returned probe may be an ICMP Echo Reply message or TCP ACK packet. Other example types of probes may include Operations, Administration, and Management (OAM) messages, such as those that conform to Y.1731 or IEEE 802.1ag.

The collected results may then be forward to policy controller 23 for further processing, including for example for use in generating graphical user interfaces depicting various metrics and/or determined statuses for communications, related to the current state of communication links that may exist between various servers 12 and/or workloads being performed via the execution of one or more applications within data center 10A.

Policy controller 23 obtains the usage metrics and metrics related to communication links between servers 12 from policy agents 35, and constructs a dashboard 203 (e.g., a set of user interfaces) to provide visibility into operational performance and infrastructure resources of data center 10A. Policy controller 23 may, for example, communicate dashboard 203 to UI device 129 for display to administrator 24. In addition, policy controller 23 may apply analytics and machine learning to the collected metrics to provide real-time and historic monitoring, performance visibility and dynamic optimization to improve orchestration, security, accounting and planning within data center 10A.

As shown in the example of FIG. 1, policy controller 23 may define and maintain a rule base as a set of policies 202. Policy controller 23 may administer control of each of servers 12 based on the set of policies 202 maintained by policy controller 23. Policies 202 may be created or derived in response to input by administrator 24 and/or in response to operations performed by policy controller 23. Policy controller 23 may, for example, observe operations of data center 10A over time and apply machine learning techniques to generate one or more policies 202. Policy controller 23 may periodically, occasionally, or continually refine policies 202 as further observations about data center 10A are made.

Policy controller 23 (e.g., an analytics engine within policy controller 23) may determine how policies are deployed, implemented, and/or triggered at one or more of servers 12. For instance, policy controller 23 may be configured to push one or more policies 202 to one or more of the policy agents 35 executing on servers 12. Policy controller 23 may receive information about internal processor metrics from one or more of policy agents 35, and determine if conditions of a rule for the one or more metrics are met. Policy controller 23 may analyze the internal processor metrics received from policy agents 35, and based on the analysis, instruct or cause one or more policy agents 35 to perform one or more actions to modify the operation of the server associated with a policy agent. For example, policy controller 23 may push one or more policies including configurations for communication protocols to be used, intervals for issuing the communication probes, and/or metrics to be monitored for use in conjunction with the agents issuing the communication probes between agents. Information collected from the policy agents related to the issuance and monitoring of these communication probes may be used to generate a dashboard including graphical user interfaces that visually depict one or more status related to the metrics associated with and/or derived from the collected information and data associated with the issuance of the communication probes. In another example, policy controller 23 may be configured to gather information about the devices and arrangement of devices included in the switch fabric 20, and generate a set of graphical user interfaces that visually depict these devices and the interconnections between these devices based on a set of pre-defined and/or user selectable rules.

In various examples, policy controller 23 distributes policy rules including tags for objects at a project level. However, policy controller 23 may additionally or alternatively distributing policy rules including tags specifying various different object levels, such as a global environment level, a project level, a virtual network level, a virtual machine level, or an interface level.

In an example implantation of the techniques of the disclosure, policy controller 23 uses a plurality of configuration objects to implement the one or more policies. As one example, policy controller 23 applies a first set of configuration objects at a global level. The first set configuration objects includes global application policy sets, global firewall policies, global firewall rules, and global tags across a plurality of levels and/or categories. Policy controller 23 distributes, for example to the virtual routers, the first set of configuration objects at the global level. Policy controller 23 match global tags associated with global application policy sets, global firewall policies, and global firewall rules to objects tagged with the global tags. Based on the global application policy sets, global firewall policies, and global firewall rules, policy controller 23 allow or block network traffic between interfaces of the objects tagged with the global tags. The interfaces may be virtual machine interfaces (VMIs), for instance.

Furthermore, policy controller 23 applies a second set of configuration objects at a project level. The second set of policy rules may include project-specific application policy sets, firewall policies, firewall rules, and tags across a plurality of levels. Policy controller 23 distributes the second set of configuration objects at the project level. Policy controller 23 matches project tags associated with project-specific application policy sets, firewall policies, and firewall rules to objects tagged with the project tags. Based on the project-specific application policy sets, firewall policies, and firewall rules, policy controller 23 allows or blocks network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks," which is incorporated by reference in its entirety.

Virtual routers 30 may receive and apply application policies relevant to executing workloads 37 on the corresponding server 12, which results in traffic statistics for flows of flow sessions managed in part by the application policies. Such application policies may specify different action with respect to the flows. As described in further detail below, virtual agents 35 upload traffic statistics for the flow sessions to collector 38 or directly to policy controller 23.

Dashboard 203 may represent a collection of graphical user interfaces presenting information about traffic flows between workloads 37 executing within system 8. Policy controller 23 may analyze traffic statistics and tag information for flows, as uploaded by agents 35, to generate user interfaces that depict the traffic flows and the application of policies by virtual routers 30.

Dashboard 203 may include one or more graphical user interfaces that are presented by user interface device 129. User interface device 129 may detect interactions with dashboard 203 as user input (e.g., from administrator 24). Administrator 24 may request graphical user interfaces for particular flows, workloads, applications, or other criteria, by interacting with dashboard 23 using one or more user interface devices (not shown).

Figure 2:
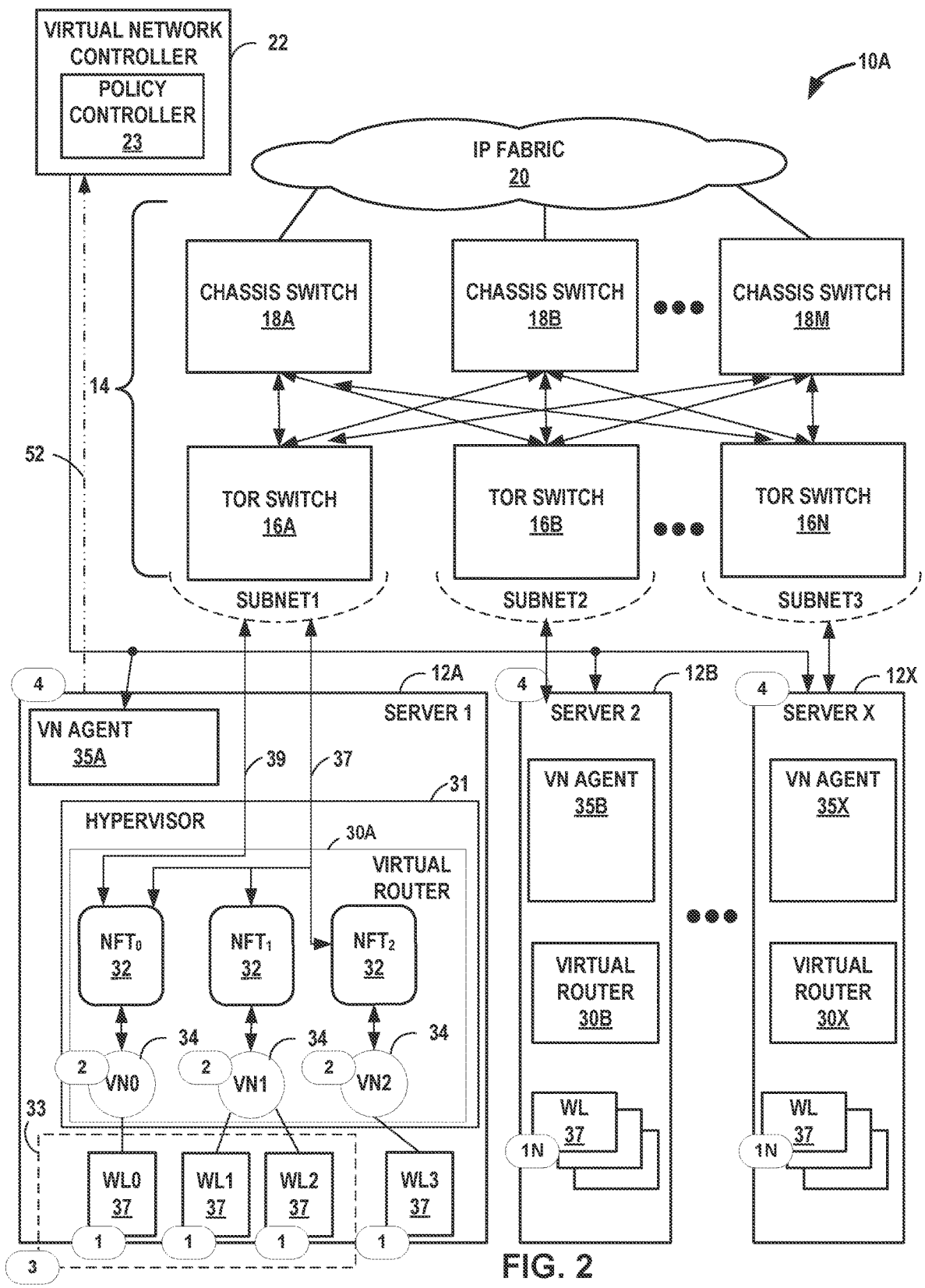
FIG. 2 is a block diagram illustrating an example implementation of a data center of FIG. 1 in further detail.

FIG. 2 is a block diagram illustrating an example implementation of data center 10A of FIG. 1 in further detail. In the example of FIG. 2, data center 10A includes an overlay network that extends switch fabric 20 from physical switches 16, 18 to software or "virtual" routers 30A-30X (again, collectively "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without a requiring multicast support in the underlying physical network.

Each virtual router 30 may execute within a hypervisor, a host operating system or other component of each of servers 12. Each of servers 12 may represent an x86 or other general-purpose or special-purpose server capable of executing workloads 37. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more workloads (WLs) 37 on top of the virtualization platform provided by hypervisor 31. Each WL 37 is associated with one of the virtual networks VN0-VN1 and may represent tenant WLs running customer applications such as Web servers, database servers, enterprise applications, or hosting virtualized services used to create service chains. In some cases, any one or more of servers 12 or another computing device may host customer applications directly, i.e., not as virtual machines. In some cases, some of WLs 37 may represent containers, another form of virtualized execution environment. That is, both virtual machines and containers are examples of virtualized execution environments for executing workloads.

In general, each WL 37 may be any type of software application and may execute on a virtualized environment, e.g., a virtual machine or container, that is assigned a virtual address for use within a corresponding virtual network 34, where each of the virtual networks may be a different virtual subnet provided by virtual router 30A. A virtualized environment may be assigned its own virtual layer three (L3) IP address, for example, for sending and receiving communications but may be unaware of an IP address of the physical server 12A on which the virtualized environment is executing. In this way, a "virtual address" is an address that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between workloads 37 and virtual network controller 22. For example, a WL 37 may request to send a message using its virtual address via the VN agent 35A, and VN agent 35A may in turn send the message and request that a response to the message be received for the virtual address of the WL 37 that originated the first message. In some cases, a WL 37 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by workloads 37 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques of the disclosure, virtual network controller 22 (or "SDN controller 22") further includes policy controller 23. Policy controller 23 is configured to tag a plurality of objects ("policy objects") across a plurality of levels. In some examples, the plurality of levels includes a level of an object, such as a global environment level, a project level, a virtual network level, a virtual machine level, or an interface level of the object. A policy object may be associated with one or more workloads. In further examples, policy controller 23 tags the plurality of objects across a plurality of categories, which may include a top category and one or more sub-categories. In some examples, the plurality of categories include applications executing within WLs 37, deployments, application tiers, geographic sites, virtual networks, WLs 37, interfaces, projects, security requirements, quality requirements, users, or compliance requirements.

According to the techniques of the disclosure, virtual router 30A of forwarding component 39A performs session-based monitoring and logging of network flow and traffic statistics. In one example, virtual router 30A of forwarding component 39A processes forward traffic flows forwarded by virtual router 30A and reverse traffic flows forwarded by virtual router 30A to generate traffic flow statistics for the traffic flows. In some examples, the traffic flow statistics for each flow include a five-tuple (e.g., a protocol, a source address, a source port, a destination address, and a destination port), a count of the packets forwarded for the flow, and/or a count of bytes forwarded for the flow. Virtual router 30A periodically communicates the generated traffic flow statistics to VR agent 35A such that VR agent maintains a similar record of the traffic flow statistics for traffic flowing through virtual router 30A.

VR agent 35A processes the generated traffic flow statistics to identify pairs of ingress traffic flows and egress traffic flows that correspond to a common communication session between one or more workloads 37. In one example, VR agent 35A identifies pairs of ingress traffic flows and egress traffic flows that correspond to a common communication session. In one example, VR agent 35A processes the traffic statistics generated by virtual router 30A to compare a protocol, a source address, a source port, a destination address, and a destination port (e.g., a five-tuple) of each sampled ingress packet flow and each egress packet flow. For example, if a first ingress flow has the same protocol as a first egress flow, if the source address and source port of the first ingress flow are the same as the destination address and the destination port of the first egress flow, and if the destination address and the destination port of the first ingress flow are the same as the source address and source port of the first egress flow, then VR agent 35A determines that the first ingress flow and the first egress flow correspond to a common communication session between two devices. However, if a second ingress flow does not have the same protocol as a second egress flow, or if the source address and source port of the second ingress flow are not the same as the destination address and the destination port of the second egress flow, or if the destination address and the destination port of the second ingress flow are not the same as the source address and source port of the second egress flow, then VR agent 35A determines that the second ingress flow and the second egress flow do not correspond to a common communication session between two devices.

For each identified pair of ingress and egress traffic flows, VR agent 35A generates session-based records of traffic statistics for the network traffic forwarded by virtual router 30A. In other words, VR agent 35A generates records of traffic statistics for the network traffic forwarded by virtual router 30A, wherein each record includes traffic statistics that pertain to a common communication session between two devices, and includes traffic statistics for an ingress traffic flow and an egress traffic flow for the common communication session.

In some examples, VR agent 35A generates such session-based records of traffic statistics for each traffic flow received by virtual router 30A. In other examples, VR agent 35A generates session-based records of traffic statistics for only a subset of the traffic flows received by virtual router 30A to generate session-based records of traffic statistics for a subset of the traffic flowing through virtual router 30A. In some examples, the subset of the traffic flows is selected at random. In yet further examples, the subset of the traffic flows is selected according to an algorithm to provide a statistically accurate representation of the traffic flows received by virtual router 30A. In some examples, VR agent 35A receives, from controller 132, an indication of one or more traffic flows that comprise the subset for which to generate the session-based records of traffic statistics.

In one example, a single session-based record 52 may include a number of "diff bytes" for both the ingress flow and egress flow associated with the session. Such "diff bytes" describe a number of bytes received for the ingress flow and a number of bytes received for the egress flow during the previous monitoring period (e.g., the difference in bytes between the end of the previous monitoring period and the end of the current monitoring period). Further, the session-based record 52 may include additional network flow and traffic statistics information, such as the total number of bytes forwarded for both the ingress flow and egress flow, an uptime both the ingress flow and egress flow, address, port and forwarding information associated with each of the ingress flow and egress flow, etc.

VR agent 35A uploads the session-based record 52 to traffic collector 34 which, in this example, is a component of SDN controller 132. In some examples, VR agent 35A periodically uploads a group of session-based records 52 generated during the previous sampling period (e.g., VR agent uploads the group of session-based records 52 to traffic collector 34 approximately once per second, once per minute, or once per day). Traffic collector 34 writes session-correlated network flow and traffic statistics information for the session record 52 into analytics database 35.

In some examples, the one or more policy rules describe security or firewall rules, and based on the one or more security or firewall rules, each policy agent 35 may allow or deny network traffic between categories described by the one or more tags. In other examples, each of the one or more policy rules describe one or more firewall, network, application, or global policy rules. Thus, by applying the policies as described herein, policy agents 35 may apply specific policy rules so as to enable workloads with specific dimensions. Further policy agents 35 may monitor and report network traffic statistics for network traffic among workloads to policy controller 23 for use in generating a user interface according to techniques here. The network traffic statistics may be reported by tag, by multiple tags, by workload identifier, by category, by interface, and so forth, to enable policy controller 23 to compute network traffic statistics for network traffic among workloads. Network traffic statistics for each application workload pair may indicate an amount of data attempted to be sent using network traffic and whether the network traffic was permitted or denied. Network traffic statistics may be monitored and reported from multiple policy agents 35 to policy controller 23, which aggregates the network traffic statistics and used the aggregated network traffic statistics to generate user interfaces, such as those described herein. The aggregated network traffic statistics may be correlated to corresponding policy rules, and the correlations may be indicated in the generated user interfaces.

Accordingly, the techniques of the disclosure may allow for scalable deployment of policies across different environments within a plurality of data centers 10. Further, the techniques of the disclosure may reduce the complexity and simplify management of such policies within the plurality of data centers 10.

In some examples, policies are "inherited" in that policies applied to parent objects are likewise applied to objects that are children of the parent objects in a hierarchical fashion. As one example, policy agent 35A receives a first policy rule that includes tag 3 that is applied to project 33. Policy agent 35A applies the first policy rule to project 33. Policy agent 35A further applies the first policy rule to children of the first project, such as workloads associated with virtual networks, virtual machines, and interfaces within the first project, but not to workloads associated with virtual networks, virtual machines, and interfaces within a second project, so as to permit or deny network traffic to the first project and objects within the first project as specified by the first policy rule. In the example of FIG. 2, policy agent 35A applies the first policy rule to workloads WL0 37, WL1 37, and WL2 37 because workloads WL0 37, WL1 37, and WL2 37 are children of project 33. However, policy agent 35A does not apply the first policy rule to workload WL3 37, which is not part of project 33.

Continuing the forgoing example, policy agent 35A receives a second policy rule that includes tag 1 that describes workloads 3737. Policy agent 35A therefore applies both the first policy rule and the second policy rule to workloads WL0 37, WL1 37, and WL2 37. Further, policy agent 35A applies both the first policy rule and the second policy rule to interfaces of workloads WL0 37, WL1 37, and WL2 37 (not depicted), which are children objects of workloads 37. However, policy agent 35A does not apply the second policy rule to project 33 because project 33 is a parent, not a child, of workloads WL0 37, WL1 37, and WL2 37.

In some examples of the techniques of the disclosure, the policy framework implements complex regular expressions to apply tags for such policies to specific environments or infrastructure. For example, such policy rules include tag expressions to group and/or segment workloads. As a further example, policy agent 35A applies a match condition to match the tag expressions with tagged objects corresponding to the tag expressions. Thus, global policies may be distributed to a plurality of policy agents 35, and each policy agent 35 may selectively apply only those policy rules that include tag expressions that correspond to tagged objects.

In some examples, policy controller 23 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference in its entirety.

Figure 3:
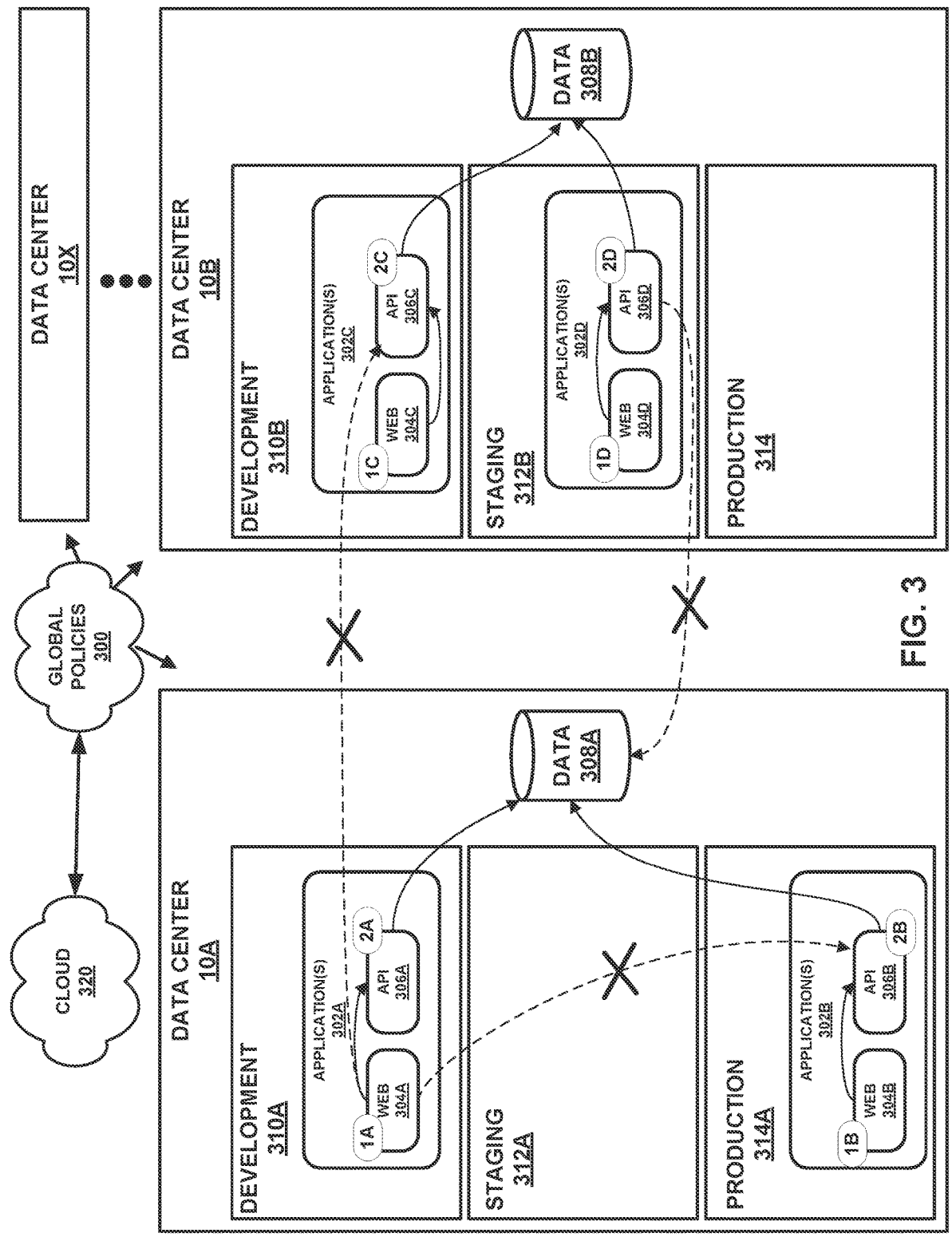
FIG. 3 is a block diagram illustrating an example of a plurality of data centers in which examples of the techniques described herein may be implemented.

FIG. 3 is a block diagram illustrating an example of a plurality of data centers 10 in which examples of the techniques described herein may be implemented. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10. Examples of data centers 10 may include a multi-cloud system, having one or more clouds coupled to the data centers 10, as illustratively represented by cloud 320. Cloud 320 may include one or a plurality of data centers, which in various examples incudes data centers having the same or similar components and configured to perform some or all of the features and functions described herein with respect to data centers 10.

In the example of FIG. 3, each of data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of a finance application. Policies as described herein are robust and extensible for application in many different types of cloud environments described above.

Within an environment, each application may include a plurality of applications. In the example of FIG. 3, application 302A of development environment 310A executes web process 304A and Application Program Interface (API) process 306A. Further, application 302B of production environment 314A executes web process 304B and API process 306B. Application 302C of development environment 310B executes web process 304C and API process 306C. Still further, application 302D of staging environment 312B executes web process 304D and API process 306D. However, in other examples, each application 302 of a respective environment 310A, 312A, 314A, 310B, 312B, or 314B may execute additional or different processes than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306 operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

If the administrator were to independently manage network traffic policies for each process 304, 306 within each application 302 within each environment 312, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

In accordance with the techniques of the disclosure, one or more tags specifying one or more categories are applied to each process 304, 306. As depicted in the example of FIG. 3, policy controller 23 of VNC 22 applies tag "1A" to web process 304A, which specifies that web process 304A belongs to development environment 310A. Similarly, policy controller 23 applies tag "2A" to API process 306A, which specifies that web process 304A belongs to development environment 310A. In contrast, policy controller 23 applies tag "1B" to web process 304B and tag "2B" to API process 306B, each of which specify that the respective application belongs to production environment 314A. Furthermore, tag "1C" is applied to web process 304C and tag "2C" is applied API process 306C, each of which specify that the respective application belongs to development environment 310B; and tag "1D" is applied to web process 304D and tag "2D" is applied to API process 306D, each of which specify that the respective application belongs to staging environment 312B.

In one example, a policy agent 139 of a VN agent 35 receives, from policy controller 23, one or more policies specifying one or more policy rules for allowing or blocking network traffic to and from applications 302. Each of the one or more policy rules specify one or more tags, each of the tags specifying one or more categories for application of the policy rules. Policy agent 139 applies, to each process 304, 306 of each application 302, only those policy rules that include tags matching tags applied to respective processes 304, 306.

For example, policy agent 139 may receive a first policy rule that permits network traffic destined for API process 306B and includes tag 1B. Policy agent 139 may examine tags for each of processes 304, 306, but apply the policy rule only to web process 304B because web process 304B is categorized within the same category as specified by tag 1B. VN agent 35 may subsequently permit network traffic flowing from an interface of a virtual machine executing web process 304B to an interface of a virtual machine executing API process 306B and block other traffic flowing to the interface of the virtual machine executing API process 306B, such as traffic flowing from an interface of a virtual machine executing web process 304A.

Similarly, policy agent 139 may receive a second policy rule that permits network traffic destined for database 308A and includes tags 2A and 2B. Policy agent 139 may examine categories applied to each of processes 304, 306. Policy agent 139 applies the policy rule only to API processes 306A and 306B because API processes 306A and 306B are categorized within the same category as specified by tags 2A and 2B, respectively. VN agent 35 may subsequently permit network traffic flowing from either an interface of a virtual machine executing API process 306A or the interface of the virtual machine executing API process 306B to an interface of database 308A and block other traffic flowing to the interface of database 308A, such as traffic flowing from a virtual machine executing API process 306D.

As depicted in the foregoing example, the second policy rule may specify tags 2A and 2B in a Boolean expression, e.g., (2A OR 2B). However, in accordance with the techniques of the disclosure, each policy rule may further include complex regular expressions that specify tags for one or more objects. For example, a policy rule may include one or more Boolean operators (e.g., AND, OR, NOT), mathematical operators (e.g., addition, subtraction, multiplication, division), bit-shifting operations, matrix operations, text parsing operators, or a combination of any of the foregoing.

In the foregoing examples, policy agent 139 implements whitelisting, in that all traffic between designated interfaces of virtual machines is preemptively blocked, and the one or more policy rules whitelist specific traffic flows (e.g., specify specific traffic flows between interfaces of virtual machines that are permitted). In alternate examples, policy agent 139 implements blacklisting, in that all traffic between interfaces of virtual machines is preemptively allowed, and the one or more policy rules blacklist specific traffic flows (e.g., specify specific traffic flows between interfaces of virtual machines that are blocked). In alternate examples, the one or more policy rules may include a combination of whitelisting or blacklisting specific traffic flows or groups of traffic flows between interfaces of virtual machines.

In the example of FIG. 3, policy agent 139 is depicted as receiving, from policy controller 23, tags specifying the specific environments to which processes 304, 306 belong. However, in other examples, policy agent 139 may receive tags that specify other categories for organizing processes 304, 306. For example, tags for processes 304, 306 may additionally, or alternatively, specify one or more application types, deployments, application tiers, geographic sites, virtual networks, virtual machines, interfaces, projects, security requirements, quality requirements, users, or compliance requirements.

For examples, one or more of data centers 10 implements a cloud environment executing OpenStack. In this example, the cloud environment supports three projects, each providing a finance application comprising three virtual networks. Within such a data center 10, policy controller 23 may assign one or more tags at a project level. For example, policy controller 23 may assign a tag comprising a key of "application" and a value of "finance" and a tag comprising a key of "deployment" and a value of "development" to a first project. Policy controller 23 may assign a tag comprising a key of "application" and a value of "finance" and a tag comprising a key of "deployment" and a value of "staging" to a second project. Policy controller 23 may assign a tag comprising a key of "application" and a value of "finance" and a tag comprising a key of "deployment" and a value of "production" to a third project. Further, within each project, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, one or more of data centers 10 is a cloud environment executing Kubernetes. In this example, the cloud environment supports two namespaces, each providing a finance application comprising three virtual networks. Within such a data center 10, policy controller 23 may assign one or more tags at a namespace level. For example, policy controller 23 may assign a tag comprising a key of "application" and a value of "finance," a tag comprising a key of "deployment" and a value of "development," and a tag comprising a key of "site" and a value of "US" to a first namespace. Policy controller 23 may assign a tag comprising a key of "application" and a value of "finance," a tag comprising a key of "deployment" and a value of "production," and a tag comprising a key of "site" and a value of "US" to a second namespace. Further, within each namespace, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, a first data center 10A implements a cloud environment executing Amazon Web Services and a second data center 10B executes on "bare metal" infrastructure." In this example, data center 10A supports a first finance application comprising three virtual networks and executing within a development deployment, while data center 10A supports a second finance application comprising three virtual networks and executing within a production deployment. In this example, policy controller 23 may assign one or more tags at an application level. For example, policy controller 23 may assign a tag comprising a key of "application" and a value of "finance," a tag comprising a key of "deployment" and a value of "development," and a tag comprising a key of "site" and a value of "US" to the first application executing within data center 10A. Policy controller 23 may further assign a tag comprising a key of "application" and a value of "finance," a tag comprising a key of "deployment" and a value of "production," and a tag comprising a key of "site" and a value of "US" to the second application executing within data center 10B. Further, within each application, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In the example of FIG. 3, policy controller 23 is described as distributing policy rules including tags for objects at a project level. However, policy controller 23 may additionally or alternatively distributing policy rules including tags specifying various different object levels, such as a global environment level, a project level, a virtual network level, a virtual machine level, or an interface level.

In an example implantation of the techniques of the disclosure, policy controller 23 uses a plurality of configuration objects to implement the one or more policies. As one example, policy controller 23 applies a first set of configuration objects at a global level. The first set configuration objects includes global application policy sets, global firewall policies, global firewall rules, and global tags across a plurality of levels and/or categories. Policy controller 23 distributes, to policy agents 139, the first set of configuration objects at the global level. Policy agents 139 match global tags associated with global application policy sets, global firewall policies, and global firewall rules to objects tagged with the global tags. Based on the global application policy sets, global firewall policies, and global firewall rules, policy agents 139 allow or block network traffic between interfaces of the objects tagged with the global tags.

Furthermore, policy controller 23 applies a second set of configuration objects at a project level. The second set of policy rules may include project-specific application policy sets, firewall policies, firewall rules, and tags across a plurality of levels. Policy controller 23 distributes, to policy agents 139, the second set of configuration objects at the project level. Policy agents 139 match project tags associated with project-specific application policy sets, firewall policies, and firewall rules to objects tagged with the project tags. Based on the project-specific application policy sets, firewall policies, and firewall rules, policy agents 139 allow or block network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments.

Figure 4:
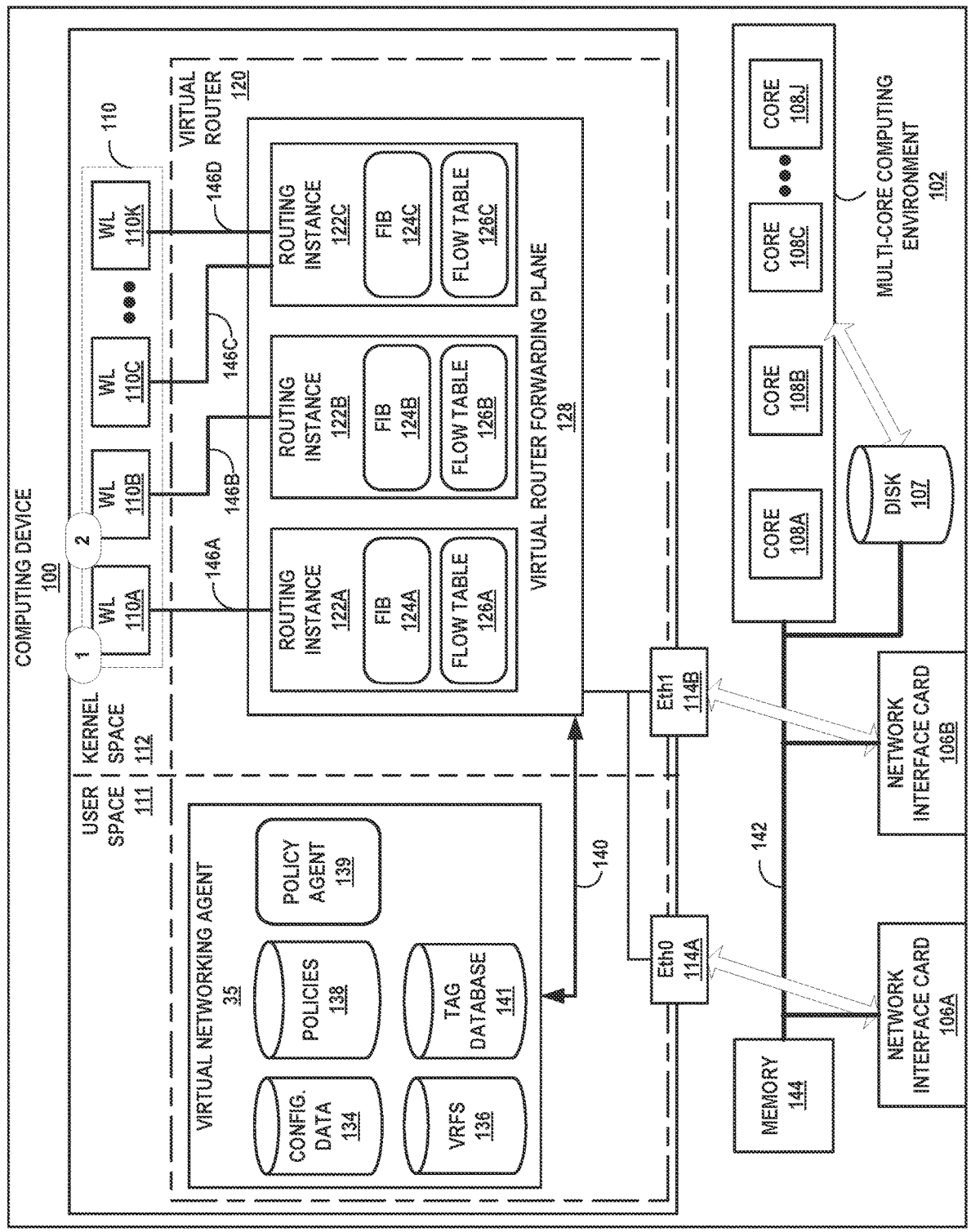
FIG. 4 is a block diagram illustrating an example computing device that executes a virtual router for virtual networks, in accordance with one or more aspects of the present disclosure.

FIG. 4 is a block diagram illustrating an example computing device 100 that executes a virtual router 120 for virtual networks in accordance with one or more aspects of the present disclosure. Computing device 100 may represent any of servers 12 of FIGS. 1-3 or other devices, such as any of TOR switches 16. Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more workloads 110A-110K (collectively, "workloads 110"). Workloads 110 may represent example instances of any of workloads 37 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage workloads 110 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of WL 110A that taps, via tap interface 146A, into routing instance 122A.

Virtual router 120 in this example includes a kernel space 112 module: virtual router forwarding plane 128, as well as a user space 111 module: VN agent 35. Virtual router forwarding plane 128 executes the "forwarding plane" or packet forwarding functionality of the virtual router 120 and VN agent 35 executes the "control plane" functionality of the virtual router 120. VN agent 35 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request VN agent 35 to install a flow table entry in the flow table for the new packet flow. This may be referred to as "slow-path"

packet processing for initial packets of packet flows and is represented in FIG. 4 by slow path 140.

In this example, VN agent 35 may be a user space 111 process executed by computing device 100. VN agent 35 includes configuration data 134, virtual routing and forwarding instances configurations 136 ("VRFs 136"), and policy table 138 ("policies 138"). VN agent 35 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. VN agent 35 may also report analytics state, install forwarding state to FIBs 124 of virtual router forwarding plane 128, discover WLs 110 and attributes thereof. As noted above, VN agent 35 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In accordance with the techniques of the disclosure, VN agent 35 further includes tag database 141. As described above, policy controller 23 of VNC 22 assigns one or more tags specifying one or more levels and/or one or more categories for the objects. Policy controller 23 may apply tags to objects across a plurality of levels or categories, as well as apply the tags to objects across a plurality of data centers. Policy controller 23 distributes these tags to VN agent 35, which stores the assigned tags in tag database 141.

VN agent 35 further includes a policy agent 139. Policy agent 139 receives, from policy controller 23, one or more policies and stores such policies in policies 138. Each of policies 138 may include one or more policy rules that spec whether particular network traffic should be allowed or blocked. Further, each policy rule includes one or more policy tags that specify to which objects, such as applications executing on WLs 110, the policy rules apply. For example, policy agent 139 may cross reference the one or more tags of a policy rule with one or more tags in tag database 141 to determine one or more objects to which the policy rule should be applied. Upon determining the one or more objects to which the policy rule should be applied, policy agent 139 allows or blocks network traffic originating from or destined to the one or more objects in accordance with the policy rule. In some examples, policy agent 139 allows or blocks network traffic at an interface level of WLs 110. In this example, interfaces 146 inherit tags from parent objects, such as WLs 110, virtual networks, parent projects, or global policy sets. 10. Thus, policy agent 139 allows or blocks network traffic destined for or originating from interfaces 146 of WLs 110 by matching tags of one or more policy rules to tags applied to interfaces 146.

As one example, policy agent 139 receives, from policy controller 23, a first policy rule that permits network traffic originating from interface 146C and includes tag 1. Policy agent 139 may examine categories applied to interfaces 146, determine that a category of interface 146A matches tag 1 of the first policy rule, and apply the policy rule only to interface 146A. VN agent 35 may subsequently permit network traffic originating from interface 146C and destined for interface 146A.

As another example, policy agent 139 receives, from policy controller 23, a second policy rule that blocks network traffic originating from interface 146C and includes tag 2. Policy agent 139 may examine categories applied to interfaces 146, determine that the category of interface 146B matches tag 2 of the second policy rule, and apply the policy rule only to interface 146B. VN agent 35 may subsequently block network traffic originating from interface 146C and destined for interface 146B.

In addition, the policy agent 139 may receive from the policy controller 23 instructions related to communication probes to be issued by the policy agent 139. The policy controller 23 may include instructions regarding the communication protocol to be used in issuing the communication probes, the interval for issuing the probes, and what data and other information the policy agent 139 would monitor for and collect in conjunction with the issuance of the probes. The Policy controller 23 may also instruct the policy agent 139 on when and how to report any results related to the issuance of the communication probes back to the policy controller 23.

To update policies for a particular object or group of objects, an administrator may instruct policy controller 23 to distribute new policies to policy agents 139 of respective VN agents 35 of a plurality of data centers 10. In some examples, policy controller 23 distributes the new policies via a BGP message. In this fashion, an administrator may manage a scalable, multi-dimensional policy framework for a plurality of data centers. Further, each policy agent 139 may automatically apply the relevant policies without requiring the administrator to individually manage or update policies for each VN agent 35. Thus, the techniques of the disclosure may greatly reduce the complexity and simplify management of such policies across the plurality of data centers 10.

Figure 5:
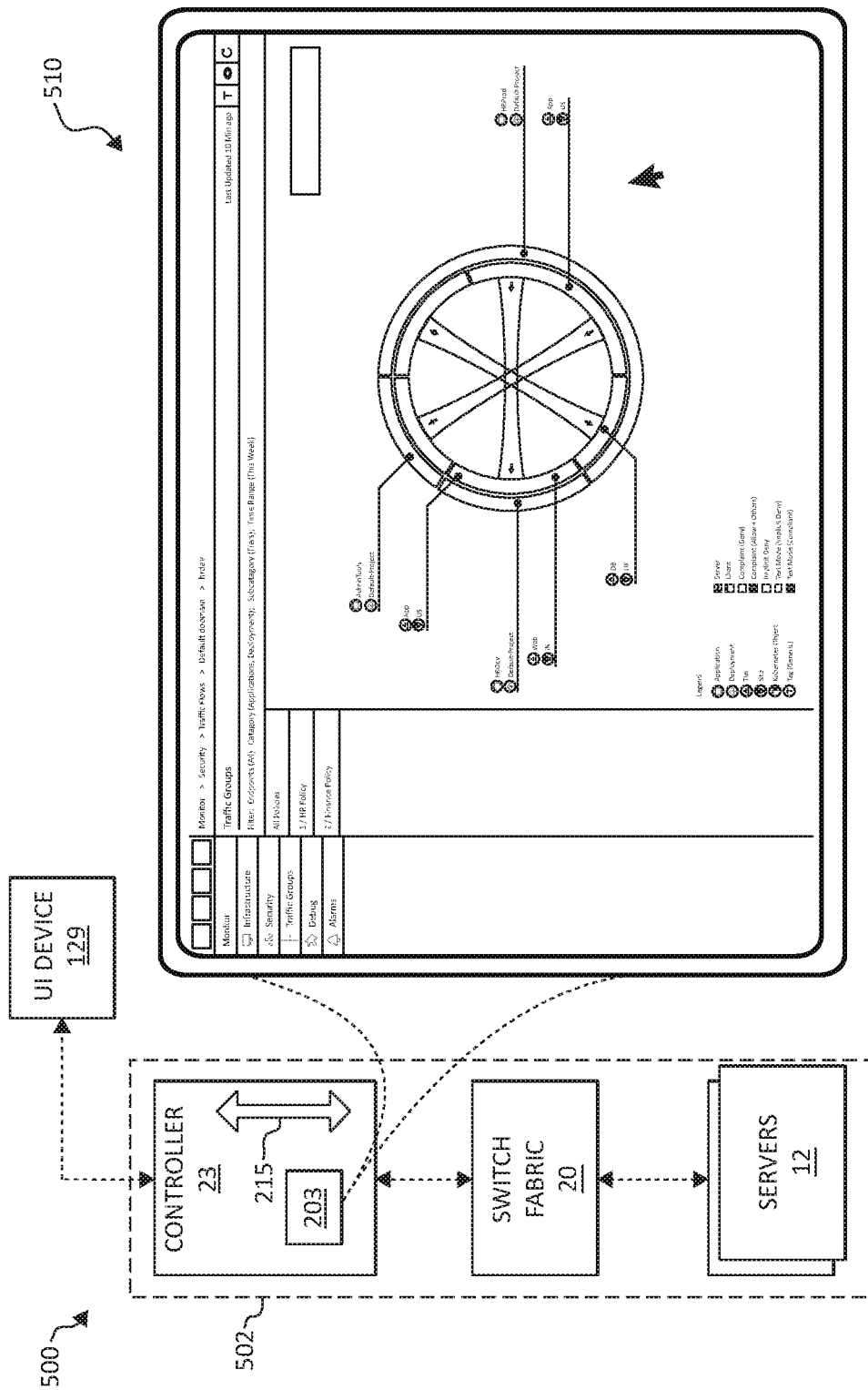
FIG. 5 is a block diagram of an example network in which a controller manages servers or compute nodes and provides a visualization of various aspects related to workflows and policy objects associated with a computer network through a dashboard, in accordance with one or more aspects of the present disclosure.

FIG. 5 is a block diagram of an example network 500 in which a controller 23 manages servers or compute nodes and provides a visualization of various aspects related to workflows and policy objects associated with a computer network through a dashboard 203, in accordance with one or more aspects of the present disclosure. In the example illustrated in FIG. 5, controller 23 is shown as part of cluster 502. In other examples, however, controller 23 is not part of cluster 502, and in such an example, "cluster 502" refers to the compute nodes but not the controller. Cluster 502 of FIG. 5 may represent a cloud-based computing network and/or a computing domain or project, or other types of computing clusters. Where cluster 502 of FIG. 5 represents a cloud environment, such a cloud environment may be an OpenStack cloud environment or a Kubernetes cloud environment. Cluster 502 may be distributed across multiple environments, such as different data centers.

Controller 23 may operate in the manner described and illustrated in connection with FIGS. 1-4. For example, controller 23 may gather and publish information related to the tags names or tag values assigned to each of the tags that have been assigned to the workloads executed as part of a projects and/or by a virtual networks, included in a computer system.

Dashboard 203 may be implemented in the manner described and illustrated in connection with FIGS. 1-4. As described in connection with FIG. 1, dashboard 203 may be created, updated, and/or maintained primarily by controller 23 and/or by a dashboard module executing on policy controller 23. In some examples, a computing device separate from controller 23 may generate dashboard 203. As illustrated in FIG. 5, controller 23 may generate dashboard 203, which may represent a collection of graphical user interfaces (e.g., including user interface 510) that provide information about topology, structure, hierarchy, utilization, and/or performance statuses and metrics associated with infrastructure elements and workloads being executed within the computer network being monitored. Controller 23 generates and outputs a graphical user interface screen, e.g., user interface 510, for display by user interface device 129. In the example of FIG. 5, user interface 510 includes a set of graphical elements arranged within the graphical user interface according to the examples and techniques described below, and any equivalents thereof. Controller 23 may use tag information and tag values assigned to the tags to label the graphical elements being displayed as part of graphical user interface displayed by user interface device 129. Such tag information may identify each of servers 12 as hosting one or more instances of a policy object, and may be arranged in a manner that illustrates the category and sub-categories assigned to these policy objects.

Different colors may be utilized to render each of the graphical elements associated with the particular policy objects being displayed to help provide visual distinction between separate policy objects within the graphical user interface. In addition, interconnection elements, representing communications between policy objects, may extend for example between a pair of graphical elements representing two respective policy objects, A color indicator may be used to render the interconnection element, the color used to indicate a particular status assigned to or defined for the communications being depicted by the particular interconnection element.

In some examples, controller 23 may, in response to inputs from a user (e.g., interactions within the display area of user interface 510), generate or update the graphical user interfaces within dashboard 203 so that infrastructure elements are filtered by devices type, interconnections, health, risk, aggregate, project, network (virtual or physical), type, and/or in other ways for example by tags and/or category/sub-category groupings. In such examples, a filter may cause some graphical elements to be hidden within dashboard 203 or a user interface of dashboard 203, while presenting other graphical elements within dashboard 203 based on the filter inputs. Filters may be applied using functional paradigms. For example, each filter may correspond to a function, so that for a given set of "x" resources, elements, or other items to be filtered, and filter functions "f" and "g," application of the filter may compute $f(g(x))$. Where filters follow functional paradigms, applying filters in a different order (e.g., $g(f(x))$) will have the same result. In some examples, some or all of filter functions are pure, so that no state information outside of the function's context is changed. Every time a filter value (or other user interface component) is changed, controller 23 may apply an appropriate filter to all the resources in a resource hash table, and then reassign the resource array to the resultant array. Filters may be applied and/or reapplied when an interaction with user interface 510 is detected, when one or more infrastructure element representations within main display area 513 are selected or changed, when metric data is received by controller 23, and/or in other situations.

In some examples, as part of generating user interface 510 controller 23 provides a visual display of circular shaped rings, which may be referred to as the "tag view," and which may be displayed as a default version of the graphical user interface provided by dashboard 203. The "tag view" of the graphical user interface may also be displayed based on receiving an input to dashboard 203 of the selection of the "tag" option included in a view selection menu as further illustrated and described below with respect to FIG. 8. In other examples, controller 23 provides an arrangement of information in a two-dimensional grid of one or more columns and one or more rows, as further illustrated and described with respect to FIGS. 12-14. Various user inputs may be provided to the graphical user interface being displayed at any given time by dashboard 203 to allow for more or less detail related to a specific policy objects, a project, a specific communication interconnection, a specific agent, a virtual network, or related to a specific port or virtual address to be rendered as the user interface being displayed by dashboard 203.

The systems, devices and methods as described in this disclosure allow the generation of these graphical user interfaces that depict, in real-time or near real-time, various graphical depictions associated with the operation of the projects and virtual networks, and the associated communications occurring within a computer network being monitored. In addition, the graphical user interfaces allow display of these projects and virtual network in a manner that organizes these graphical elements depicting the policy objects and associated communications based on the tags and categories/sub-categories assigned to these policy objects and communication interconnections.

Although the graphical elements as described throughout this disclosure may relate to projects and virtual networks operating within a computer network being modeled by the graphical user interfaces, the representations included in the examples of graphic user interfaces are not limited to projects and/or virtual networks. Graphic elements as described in this disclosure may include graphic symbols representing virtual entities, such as virtual servers, virtual router, and/or virtual instance of other computer/software entities that may have connections to one or more physical devices and/or to other virtual entities that may be graphically rendered and visually represented in a graphical user interfaces according to any of the examples described in this disclosure.

The graphical user interfaces described in this disclosure, and any equivalents thereof that may be generated and displayed using the systems, devices, and methods described herein, provide a visual tool that may allow a user, such as an information technology (IT) professional or a technician, to quickly and efficiently model, visualize, and locate issues associated with the performance of a computer network in real or near real-time. The user interfaces as described in this disclosure allow a user to view a variety of relationships between policy objects, including the communication interconnections and policy rules associated with these commination interconnections for a plurality of policy objects operating within the computer system being depicted by the graphical user interface, and to quickly move to more a detailed-level graphical user interface that provides a visual representation of more specific information, such as graphical and/or textual information associated with various policy objects and/or communications occurring within the computer network based on simple inputs to the system generating the graphical user interfaces, such as inputs to user interface 129 coupled to controller 23.

Figure 6A:
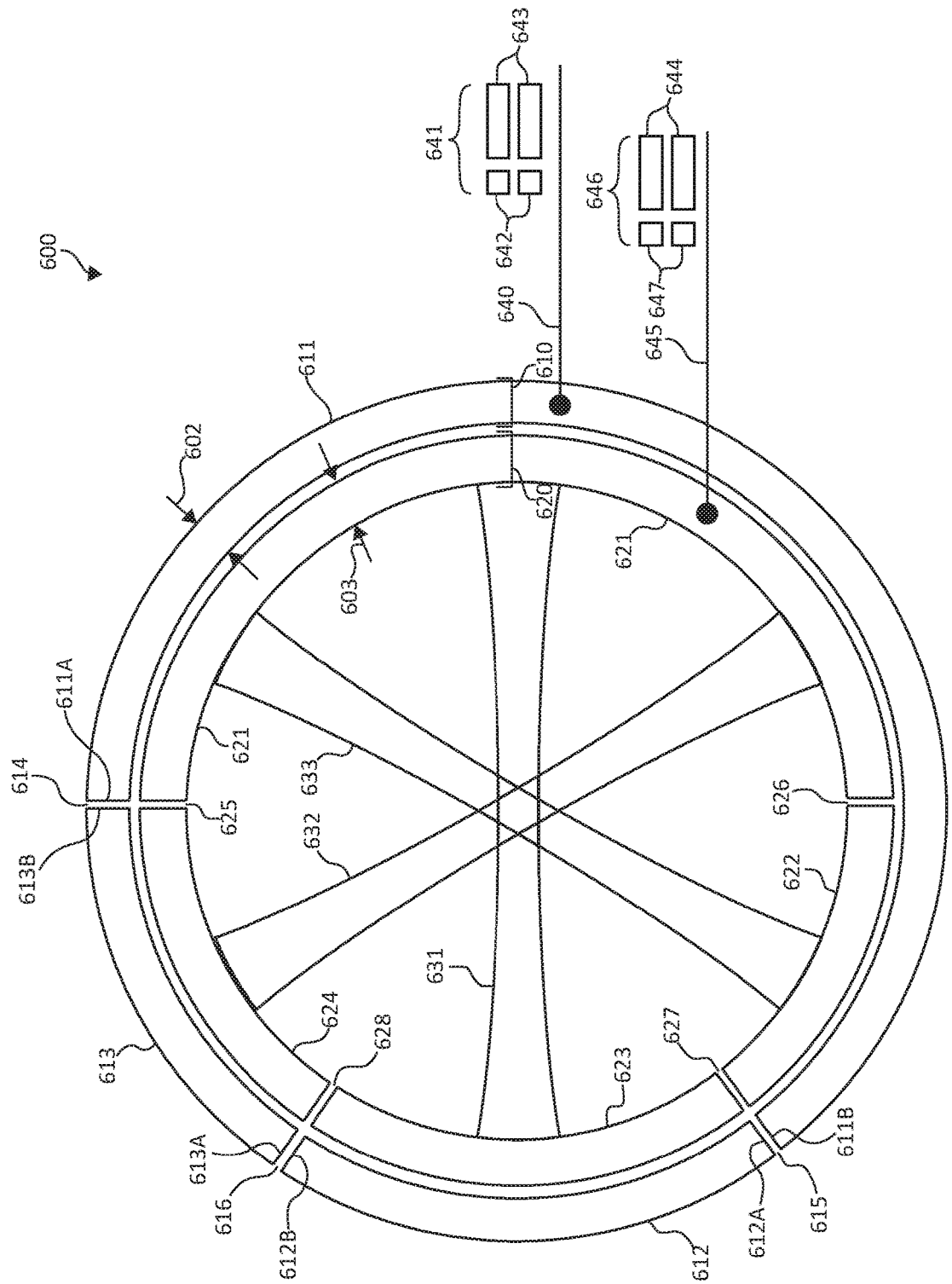
FIG. 6A illustrates an example graphical user interface that may be used by a computing device for generating graphical user interfaces, in accordance with one or more aspects of the present disclosure.

FIG. 6A illustrates an example graphical user interface generated by a computing device, in accordance with one or more aspects of the present disclosure. A layout of graphical elements the same as or similar to the layout described below with respect to user interface 600 may be used as a basis for the layout for graphical elements depicting workloads and other policy objects according to any the examples of graphical user interfaces described herein, and any equivalents thereof. User interface 600 includes an outer ring generally indicated by bracket 610 (hereinafter "outer ring 610"), and an inner ring generally indicated by bracket 620 (hereinafter "inner ring 620"). Outer ring 610 may be comprised of a plurality of individual arc or semi-circular shaped segments (hereinafter referred to as "circular segments" or "segments"), illustratively shown as segments 611, 612, and 613. Each of segments 611, 612, and 613 have a thickness, generally indicated by the distance between arrows 602, and are positioned relative to one another to encircle an interior area 630. Each of the segments 611, 612, and 613 may also be separated from any adjacent segment in outer ring 610 by small gaps extending between adjacent end portions of the respective adjacent segments.

Segments 611, 612, and 613 may represent different entities, for example different workloads associated with execution of an application, that have been assigned a different tag name or tag value for a given tag, the given tag having been designated as an upper level tag, such as a tag associated with a category. As example of such an upper level tag may be the "Application" tag, and the tag name or the tag value assigned to each segment 611, 61, 613, respectively, may represent for example a name of the application the workload is associated with, such as the "HR" Human Resources application. Each of segments 611, 612, 613 is arranged around a portion of the outer ring 610, and rendered in a manner that provides a visual separation between the segments. For example, a first end 611A of segment 611 is positioned near the top portion of outer ring 610, and is adjacent to a second end 613B of segment 613. The first end 611A of segment 611 is separated from the second end 613B of segment 613 by gap 614. Similarly, a second end 611B of segment 611 is positioned adjacent to a first end 612A of segment 612, wherein second end 611B is separated from first end 612A by gap 615. A second end 612B of segment 612 is positioned adjacent to a first end 613A of segment 613, wherein second end 612B is separated from first end 613A by gap 616. The width of the gaps 614, 615, 616, i.e., the amount of space provided by the gaps between the end portions of the adjacent segments, is not limited to a particular spacing, and may be adjusted to provide a spacing that presents some amount of visual distinction between the segments when viewed by a user. As shown in FIG. 6A, gaps 614, 615, and 616 may aid in providing a visual separation between the segment 611, 612, and 613 when the user interface 600 or a user interface using a similar scheme for the layout of an outer ring 610 is provided as part of a graphical user interface according to any of the techniques described herein.

In addition to the use of gaps 614, 615, and 616, segments 611, 612, and 613 may also be presented in the graphical user interface using different colors for each segment. The use of different colors for each segments may further aid in providing visual distinction between the different segments represented in the graphical user interface. Techniques used to visually distinguish the segments 611, 612, and 613 from one another are not limited to the use of color, and may include other techniques, such as the use of different types of lines (e.g., solid lines versus dashed or dotted lines), which may be used to outline the segments to distinguish one segment from other segments in the outer ring 610. In some examples, animation, such as flashing of the outline line, or alternating the colors used to fill a particular segment (e.g., flashed between white and a color other than white), or different rates of flashing of the outline or the color(s) used to fill a segment, may be used to represent a status associated with a segment 611, 612, and/or 613, and/or to further visually distinguish the segments included in outer ring 610 from one another.

Each segment included in outer ring 610 may include labeling including a lead line and additional graphical and/or text information associated with a given segment. Using segment 611 as an illustrative example, lead line 640 includes an end of the lead line ending in a circle or a "dot" located within the interior space enclosed by the segment 611. Lead line 640 extends to an area outside of outer ring 610, and extends to one or more graphical symbols and/or text information, generally indicated by bracket 641 (hereinafter "information 641") that is associated with segment 611. For example, information 641 may include one or more graphical symbols 642. Each of the one or more graphical symbols 642 may represent a symbol indicative of a particular tag, such as a category, that a workload represented by segment 611 has been assigned. Each of the graphical symbols 642 may have text 643 adjacent to the respective graphical symbol. Text 643 may include information, such as a tag name or tag value that is associated with the adjacent graphical symbol 642, the text indicative of the specific tag label or name associated with the tag that segment 611 has been assigned.

As described above, examples of user interface 600 may also include an inner ring 620. Inner ring 620 may comprise segments 621, 622, 623, and 624 arranged relative to one another in a manner similar to that described above with respect to segments 611, 612, and 613 and outer ring 610, but instead forming inner ring 620 encircled by outer ring 610. Each of segments 621, 622, 623, and 624 may have a thickness, generally indicated by the distance between arrows 603, and may be positioned relative to one another to encircle the interior area 630 of the user interface. Each of the segments 621, 622, 623, and 624 may also be separated from adjacent segments within inner ring 620 by small gaps (e.g., gaps 625, 626, 627, and 628 as shown in FIG. 6A) extending between adjacent end portions of the respective adjacent segments.

Each segment included in inner ring 620 may include labeling including a lead line and additional graphical and/or text information associated with a given segment. Using segment 621 as an illustrative example, lead line 645 includes an end of the lead line with a circle or "dot" located within the interior space enclosed by the segment 621. Lead line 645 extends to an area outside outer ring 610, and extends to one or more graphical symbols and/or text information, generally indicated by bracket 646 (hereinafter "information 646") that is associated with segment 621. For example, information 646 may include one or more graphical symbols 647. Each of the one or more graphical symbols 647 may represent a symbol indicative of a particular tag, such as a sub-category tag, that the workload represented by segment 621 has been assigned. Each of the graphical symbols 647 may have text 648 adjacent to the respective graphical symbol. Text 648 may include information, such as a tag name or tag value that is associated with the adjacent graphical symbol 647, the text indicative of the specific tag name or tag value associated with the tag or tags that segment 611 has been assigned.

Inner ring 620 including segments 621, 622, 623, and 624 may be positioned so that inner ring 620 lies entirely inside the area that is encircled by outer ring 610, and so that inner ring 620 at least partially encircles a portion of interior space 630 that is also at least partially encircled by outer ring 610. Inner ring 620 may in some examples be considered to be concentric to outer ring 610 in that the rings in general are centered around a same center point located within interior area 630. Each of segments 621, 622, 623, and 624 may correspond to a workload that has been assigned one or more tags associated with a sub-category. For example, each of segments 621, 622, 623, and 624 may be assigned a unique tag name or tag value associated with a particular tag, such as the "Tier" tag, or a plurality of tags, such as the "Tier" tag and the "Site" tag, that have been designated as sub-category tags.

Individual ones of segments 621, 622, 623, and 624 may be rotationally positioned within inner ring 620 so that each segment is located adjacent to an upper level segment located on the outer ring 610 to which the workload represented by the particular segment 621, 622, 623, and 624 is associated with. For example, segments 621 and 622 are rotationally positioned around inner ring 620 so that both segments are positioned adjacent to the portion of outer ring 610 that includes segment 611, indicating that the workloads depicted by both segments 621 and 622 are workloads associated with the workload or policy object being depicted by segment 611. Similarly, segment 623 is rotationally positioned within inner ring 620 so that segment 623 is located adjacent to segment 612 located on outer ring 610, and segment 624 is rotationally positioned within inner ring 620 so that segment 624 is located adjacent to segment 613 on outer ring 610. As such, this arrangement depicts a relationship between the workload represented by segment 623 of inner ring 620 and the workload or policy object represented in the outer ring 610 by segment 612, and another relationship between the workload represented by segment 624 of inner ring 610 and the workload or policy object represented in the outer ring 610 by segment 613.

For example, the workloads depicted by segments on inner ring 620 may represent additional tags, and differences between the workloads based on the assigned tag names or tag values assigned to tags, that are defined to be sub-category tags relative to the tag or tags defined as category tags and represented by the segments arranged in the outer ring 610. In various examples, each segment depicted on the outer ring 610 may correspond to a workload or policy object assigned to one or a plurality of tags being depicted in a given graphical user interface defined to be a category tag, and segments located within the inner ring 620 may correspond to a workload or policy object assigned to one or a plurality of tags being depicted in the given graphical user interface defined to be sub-category tag(s), wherein the segments displayed within the inner ring 620 are rotationally positioned adjacent to a corresponding segment located in outer ring 610.

The extend to which a given segment extends around a perimeter of outer ring 610 is not limited for example to any particular angular value, and may depend on the number of corresponding segments that need to be positioned rotationally adjacent to the segment of the outer ring around the inner ring 620. And while user interface 600 is illustrated in FIG. 6A as including outer ring 610 and inner ring 620 generally forming a circular shape, the layout of the segments is not limited to forming a circular shape. Other arrangements of the segments, for example shapes such as squares, rectangle, oval, ellipses, or other closed shapes that encircle interior area 630 are possible, and are contemplated as possible examples for the arrangements used to layout the segments depicting the graphical elements of the graphical user interfaces described herein. In addition, examples of user interface 600 may include an outer ring 610 having a first shape, and an inner ring 620 having a second shape that is a different relative to the first shape of outer ring 610.

As described above, outer ring 610 and inner ring 620 encircle an interior area 630. Interior area 630 may include one or more interconnection elements 631, 632, 633 as shown in FIG. 6A. Interconnection elements 631, 632, 633 may be graphically illustrated as a line or as an extended bar shape that extends across some portion of interior area 630, and visually ties a first graphical element of the set of graphical elements forming the inner ring to a second graphical element of the set of graphical elements forming the inner ring. In some examples, the interconnection segment may actually touch or overlap with one or both of these graphical elements. In other examples, the interconnection element does not touch or directly couple these graphical elements that the interconnection elements extends between, but for example terminates near each of these graphical elements at the respective ends of the interconnection element.

Each of the interconnection elements may represent a communication link between the workloads or policy objects being depicted by the segments coupled together by the interconnection element extending between the segments and indicates a status of communications between a different pair of workloads of the plurality of workloads. In various examples, these communication statuses may include permitted or denied, compliant, or implicitly denied status.

In various examples, the interconnection element may be rendered in a particular color that is indicative of a parameter, such as the allowability or permissions associated with the communication link represented by the interconnection element. In various examples, one or more additional graphical symbols, such as arrows and/or double-headed arrows, may be included with the depiction of an interconnection element to indicate a parameter, such as a direction or directions that that communications being represented by the interconnection elements are occurring in.

FIG. 6B illustrates another example user interface 650 that may be used by a computing device for generating graphical user interfaces, in accordance with one or more aspects of the present disclosure. The layout of graphical elements as illustrated and described below with respect to user interface 650 may be used as a basis for the layout for graphical elements depicting workloads and other policy objects according to any of the examples of graphical user interfaces described herein, and any equivalents thereof.

User interface 650 includes elements previously illustrated and described above with respect to user interface 600 and FIG. 6A and using the same corresponding reference numbers, respectively, for these same or similar elements, but with examples of variations included in user interface 650 as further described below. As shown in FIG. 6B, user interface 650 includes outer ring 610 including segments 611, 612, and 613 arranged in an end-to-end manner to form the circular shape of outer ring 610, and inner ring 620 including segments 621, 622, 623, and 624 arranged in an end-to-end manner to form the circular shape of inner ring 620, which is encircled by outer ring 620. In addition, user interface 650 includes at least one additional (second) inner ring generally indicated by bracket 660 (hereinafter "second inner ring 660"). Second inner ring 660 includes arc or semi-circular shaped segments 661, 662, 663, and 664, arranged in an end-to-end manner to form second inner ring 660 in a generally circular shape. Second inner ring 660 is formed within interior area 630, and is encircled by both outer ring 610 and inner ring 620. The segments 661, 662, 663, and 664 each represent a workload or other policy object that is assigned a tag, or a plurality of tags, defined as a sub-category tag and associated with a tag level defined as being below the level of the sub-category tag(s) assigned to the workloads and/or policy objects represented by the segments located in (first) inner ring 620.

The rotational positioning of each of segments 661, 662, 663, and 664 located in the second inner ring 660 are aligned so that the segments are adjacent to a respective segment in inner ring 620 that the respective segments 661, 662, 663, and 664 are associated with. For example, each of the segments positioned within second inner ring 660 may be associated with a custom tag, and assigned a tag name or tag value for the custom tag that defines that workload's segment relative to the other segments depicted by the second inner ring 660. The depictions of the segments 661, 662, 663, and 664 may be rendered in a graphical user interface using any of the techniques, including line type, colors, and/or animation described above for the segments located in outer ring 610 and inner ring 620. For example, gaps 663, 664, and 665 may be used to provide separation between the segments positioned within the second inner ring 660. Further, one or more interconnection elements, (not shown in FIG. 6B, but for example similar to interconnection elements 631, 632, 633, FIG. 6A) may extend across portions of interior area 630 to couple a pair of the segments 661, 662, 663, and 664 located within the second inner ring 660 to depict communications between the segments coupled by the interconnection element.

In some example, a user interface similar to user interface 650 may be used to generate a layout of graphical elements included in a graphical user interface as described herein, or any equivalent thereof, and may include additional inner ring(s), generally indicated by the dashed lines and bracket 670 (hereinafter "additional inner ring(s) 670"). Each of the additional inner ring(s) 670 provided as part of a user interface such as user interface 650 may include segments arranged in an end-to-end manner as described above, representing respective workloads or other policy objects of a computer network, and may be arranged to show relationships between adjacent segments and/or communications depicted as interconnection elements as described above with respect to outer ring 610, inner ring 620, and/or second inner ring 660. The number of additional inner ring(s) 670 that may be included in a given layout used to generate a graphic using interface as described herein or any equivalent thereof is not limited to any particular number of additional inner ring(s), and may be determined in some examples by the number of sub-categories the tags associated with the workloads and policy objects of the computer network being modeled is defined to have. For example, the total number of inner rings included in a layout of graphical elements as described herein or any equivalent thereof may be equal to at least the number of sub-categories of tags that may be assigned to the workloads and policy objects of the computer network being modeled by the graphical user interface.

Figure 7:
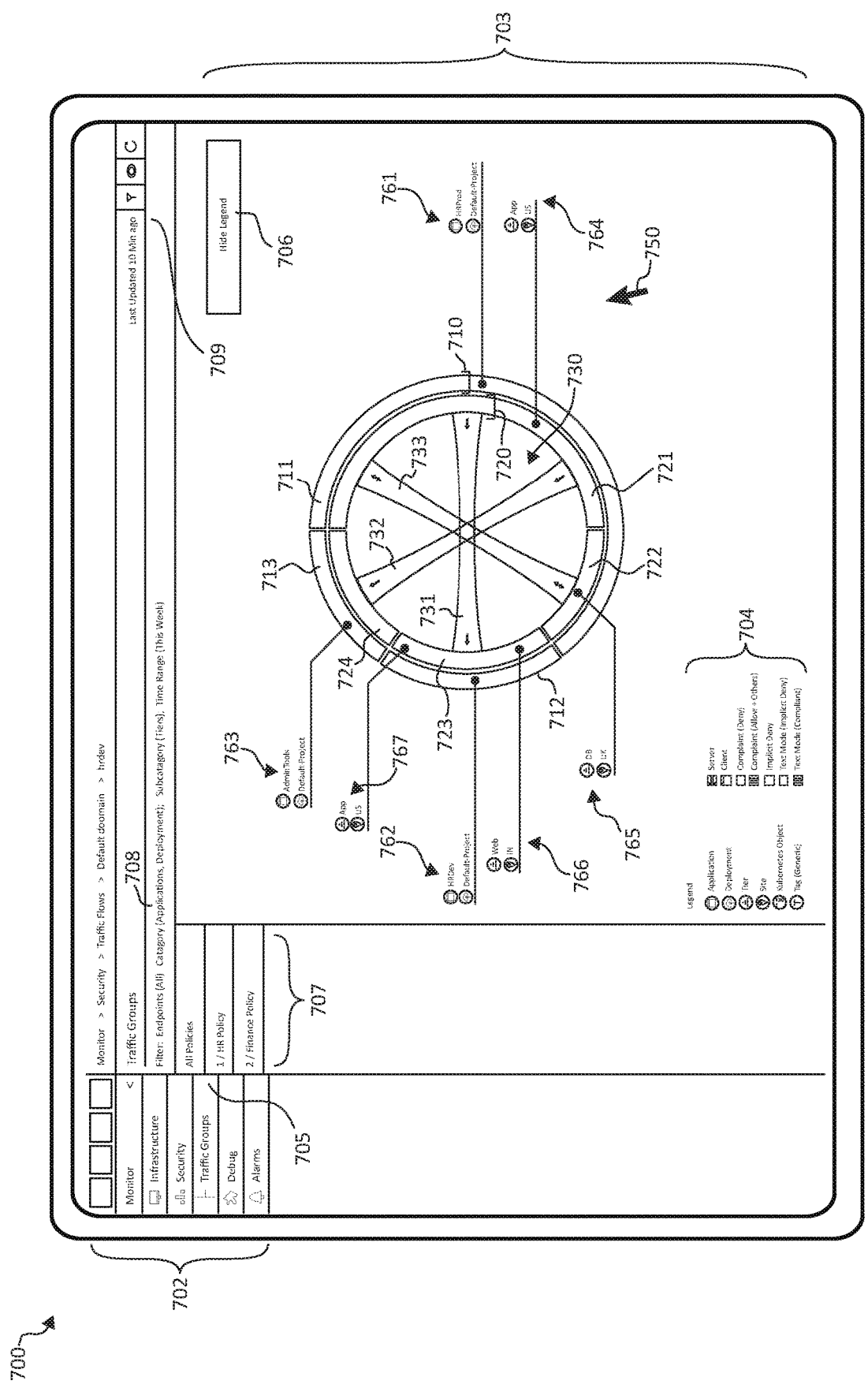
FIG. 7 illustrates an example graphical user interface output by a computing device that presents a graphical view including segments representing workloads and communications between workload, in accordance with one or more aspects of the present disclosure.

FIG. 7 illustrates an example graphical user interface 700 output by a computing device that presents a graphical view of policy objects in a computer network, in accordance with one or more aspects of the present disclosure. Graphical user interface 700 may be generated by a computing device as part of dashboard 203 (FIG. 1) using a user interface having a similar layout and arrangement of graphical elements as described above for example with respect to user interface 600 and FIG. 6A. As shown in FIG. 7, graphical user interface 700 includes one or more information sections (hereinafter "information section 702"), generally indicated as begin to the right of bracket 702 in FIG. 7. Graphical user interface 700 also includes a main display area (hereinafter "main display area 703"), generally indicated as being located to the left of bracket 703 in FIG. 7. Portions or all of the graphical elements included in the information section 702 may extend across the top portion of graphical user interface 700 and be located above, at least in part, the main display area 703.

One or more portions of information section 702 may include selectable graphical elements and/or selectable menus, such as pull-down menus, that may be selected and/or have content associated with that portion of the graphical user interface that may be selected and/or amended based for example on user inputs received by the computing device generating graphical user interface 700. For example, a cursor such as cursor 750, may be manipulated by user inputs provided to the computing device generating graphical user interface 700 to position the cursor over graphical elements located within information section 702, and/or to indicate a selection of one or more of the graphical elements. Other portions of information section 702 may provide information, for example in the form of text and/or graphical symbols, that are indicative of one or more parameter or other aspects of the information being provided within main display area 703.

As shown in FIG. 7, main display area 703 includes a display of graphical elements, e.g., segments, arranged in an outer ring 710 surrounding segments arranged within an inner ring 720. Outer ring 710 includes a plurality of arc or semi-circular shaped segments 711, 712, and 713 arranged in an end-to-end manner, each segment having a first end and a second end, each end located adjacent to another other and different segments, respectively, of the outer ring and separated from one another, respectively, by a plurality of gaps in a manner similar to that described above with respect to outer ring 610 and FIG. 6A. As also shown in FIG. 7, inner ring 720 is positioned within the outer ring 710, wherein inner ring 720 includes a plurality of arc or semi-circular shaped segments 721, 722, 723, and 724 arranged in an end-to-end manner, each segment having a first end and a second end located adjacent to other and different segments, respectively, of the inner ring and separated from one another, respectively, by a plurality of gaps in a manner similar to that described above with respect to inner ring 620 and FIG. 6A.

In FIG. 7, graphical user interface 700 includes three separate interconnection elements 731, 732, and 733, extending across interior area 730 surrounded by the outer ring 710 and the inner ring 720, the interconnection elements extending between two respective segments of inner ring 720. For example, interconnection element 731 extends between segment 721 and 723 of the inner ring 720, and represents communications occurring or configured to occur between the workflows represented by segments 721 and 723. Interconnection element 732 extends between segments 721 and 724 of the inner ring 720, and represents communications occurring or configured to occur between the workflows represented by segments 721 and 724. Interconnection element 733 extends between segments 721 and 722 of inner ring 720, and represents communications occurring or configured to occur between the workflows represented by segments 721 and 722.

The segments illustrated in graphical user interface 700 including segments 711, 712, 713, 721, 722, 723, and 724 may represent, respectively, individual workloads or other policy objects associated with a computer network, and interconnection elements 731, 732, and 733 may represent, respectively, communications occurring or configured to occur between the workload(s) and/or other policy object(s) coupled by the interconnection element. The segments depicted in user interface 700 may be examples of any of the segments described above with respect to any of FIGS. 6A and 6B, and may be configured to perform any of the functions and provide any of the features as described with respect to the segments in these figures.

As shown in FIG. 7, each of the segments 711, 712, and 713 of the outer ring 710 and each of the segments 721, 722, 723, and 724 of the inner ring 720 may be associated with a lead line and graphical symbols and/or text specific to that particular segment, respectively, for example in a manner similar to that described above with respect to lead line 640, graphical symbols 642, and text 643 associated with segment 611 in FIG. 6A. For example, as shown in FIG. 7, each of the segments 711, 712, and 713 in outer ring 710 have a respective lead line touching the segment, and graphical symbols and text positioned at an end of the respective lead line opposite the end of the lead line in contact with the segment. For example, segment 711 is associated with a lead line, graphical symbols and text generally indicated by arrow 761. One end of the lead line associated with segment 711 terminates in a "dot" within the interior portion of segment 711, and two graphical symbols representing the "Application" tag and the "Development" tag associated with segment 711 are displayed above the lead line. These graphical symbols correspond to graphical symbols and associated descriptions provided for each graphical symbol keyed to a legend that may be displayed in main display area 703, for example as generally indicated by the legend shown to the left of bracket 704 (hereinafter "legend 704"). As shown in graphical user interface 700, the tag name associated with the "Application" tag assigned to the workload or policy object associated with segment 711 is label "HRProd," and the tag name associated with the "Development" tag assigned to the workload or policy object associated with segment 711 is labeled "Default-Project." The text labels appear to the right of the corresponding graphical symbols representing these tags, and just above the end of the lead line opposite the end of the lead line where the lead line terminates within the segment 711.

Each of the segments in addition to segment 711 included in graphical user interface 700 may also be associated with a lead line and corresponding graphical symbol(s) and text. As shown in graphical user interface 700, segment 712 is associated with a lead line, graphical symbols and corresponding text generally indicated by arrow 766, and segment 713 is associated with a lead line, graphical symbols and corresponding text generally indicated by arrow 763, arranged in a manner similar to that described above with respect to segment 711. As illustrated by graphical user interface 700, each of the segments 711, 712, and 713 are located within outer ring 710, and are assigned a tag name or value for both the "Application" tag and the "Development" tag. As such, the "Application" tag and the "Development" may represent tags associated with a category defined for these particular tags.

The segments of inner circle 720 may also include associated lead lines, graphical symbol(s), and corresponding text. As shown in graphical user interface 700, segment 721 is associated with a lead line, graphical symbols and corresponding text generally indicated by arrow 764, segment 722 is associated with a lead line, graphical symbols and corresponding text generally indicated by arrow 765, segment 723 is associated with a lead line, graphical symbols and corresponding text generally indicated by arrow 767. In graphical user interface 700, segment 724 may not include any tag names or labels associated with the workload or policy object. Segment 724 may represent a placeholder segment that corresponds to segment 713 located in the portion of the outer ring 710 that corresponds to the position of segment 724, and thus may not include a separate lead line, graphical symbol(s) or text associated with segment 724. The fact that segment 724 is a placeholder may be indicated in user interface 700 by rendering segment 724 using a same color that is used to render and display segment 713. In some examples, when a segment such as segment 724 is not identified with sub-category tags, the color used to render segment 724 may be a same color used to render segment 713 located in the outer ring 710, and any interconnection element contacting segment 724 may represent communications occurring or configured to occur between corresponding segment 713 in the outer ring 710 and the segment locate at the opposite end of the interconnection element contacting segment 724. In some examples, when no sub-category tags have been assigned to the segment representing a workload or a policy object in the category, such as segment 713, segment 724 may not be provided, and any interconnection elements representing communications occurring or configured to occur between the workflows or policy objects represented by segment 713 and other workflows or policy objects being depicted in graphical user interface 700 may be illustrated as having the interconnection element extending and in direct contact with segment 713.

Various inputs may be received by the computing device generating graphical user interface 700 that alter one or more visual aspects of the user interface begin provided. For example, receipt by the computing device of a selection of the "Hide Legend" bar 706 may cause the computing device to remove the lead lines, graphical symbol (a) and text associated with each of the segments in the display being provided within main display area 703. In another example, receipt of inputs at the computing device generating graphical user inter 700 indicating a selection of the "Filter" button 709 may generate user selectable inputs and/or menus that allow additional user inputs to be provided that filter which elements, such as which workflows or policy objects associated only with a particular list of tags or tag types, are to be displayed within the main display area 703. A filter information bar, such as bar 708, may be provided as part of the information section 702, the filter information bar 708 including a text description of the current filter or filters that are being used to control the display being provided in main display area 703. Selections made within column 707 of information sections 702 may allow a user to select between different applications that may then be used as a basis for determining which tags associated with the selected application(s) are to be presented as segments in the outer ring 701 of the graphical user interface being provided by the computing device. Selections made in column 705 of information section 702 may allow a user to change the display being provided within graphical user interface 700 to a display generated and/or associated with a different program not associated with the graphical user interfaces described in this disclosure, such as other programs used for example to debug or provide alarms related to commuter systems.

Figure 8:
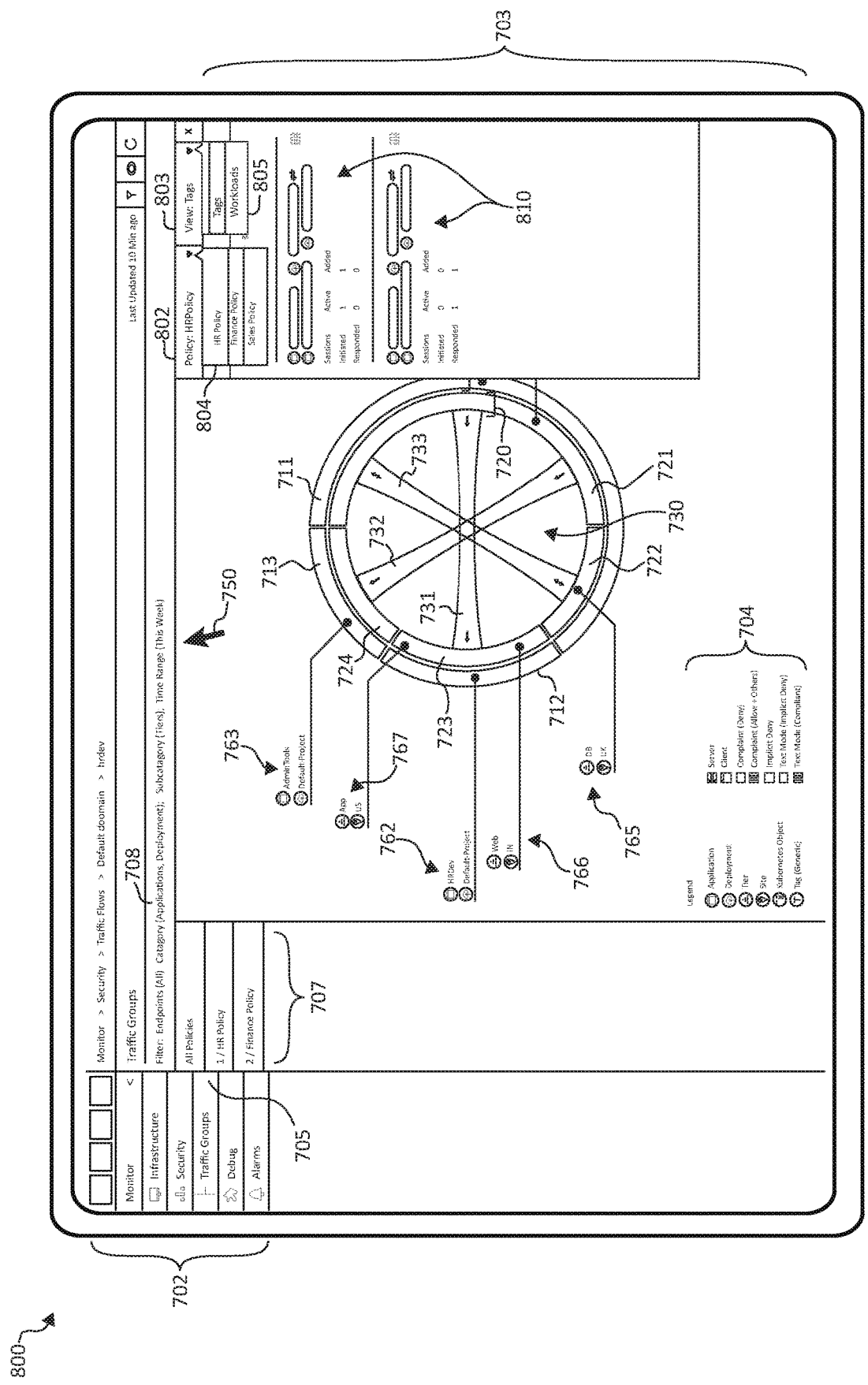
FIG. 8 illustrates an example graphical user interface output by a computing device that presents a graphical view of policy objects in a computer network, in accordance with one or more aspects of the present disclosure.

FIG. 8 illustrates an example graphical user interface 800 output by a computing device that presents a graphical view of policy objects in a computer network, in accordance with one or more aspects of the present disclosure. The illustration of user interface 800 includes features that remain the same as or similar to corresponding features illustrated and described with respect to user interface 700 and FIG. 7. These corresponding features as shown in FIG. 8 in conjunction with user interface 800 retain the same reference numbers, and may provide the same or similar features, and perform the same or similar functions as was described above with respect to user interface 700. Such corresponding features may include information section 702, main display area 703 including segments arranged in outer ring 710 and in inner ring 720, and legend 704. Examples of differences between user interface 700 of FIG. 7 and user interface 800 as illustrated and described with respect to FIG. 8 are further described below.

User interface 800 as shown in FIG. 8. includes one or more tabs 802, 804, which may be included in the information section 702, or may be positioned for example in a portion of the main display area 703, e.g., in an upper right hand corner of the main display area as shown in FIG. 8. Tab 802 may be a "Policy" tab, and may provide a selection of different policy names, such as "HR Policy," "Finance policy," and "Sales Policy" as illustrative examples, that may be selected when the pull-down menu feature of tab 802 has been selected. The individual policy names may then be selected (e.g., based on user inputs) from the pull-down policy list 804 provided by tab 802 when an indication of the selection of pull-down features of tab 802 has been received by the computing device generating graphical user interface 800. Based on an indication of a selection of a policy name from the policy list 804, the computing device generating graphical user interface 800 may render the display being provided in main display area 703 to depict segments associated with categories and sub-categories associated with the selected policy. The number of entries included in the policy list 804 is not limited to a particular number of list entries, and may include any number of list entries associated with policies defined for the system being modeled using graphical user interface 800.

As shown in FIG. 8, the current selection for a "Policy" associated with tab 802 is the "HR Policy," and therefore the segments (e.g., segments 711-713 and 721-724) represented in main display area 703 are associated with workflows and/or policy objects generated by the execution of one or more applications associated with the "HR Policy," or workflows and/or policy objects communicating with or configured to communicate with the workflows and/or policy objects generated by the execution of the application(s) associated with the "HR Policy." If inputs are received though selections may to the policy list 804 indicating selection of a different policy other than the "HR Policy," the computing device generating graphical user interface 800 may re-generate the graphical user interface to illustrated segments, arranged in a same or similar manner as illustrated in FIG. 8, but corresponding to the tags associated with the application(s) and workflows/policy objects associated with the newly selected policy.

As also shown in user interface 800, a "Views" tab 803, when selected, may provide a pull-down menu that allows a user to select between a "Tags" view and a "Workflows" view to be generated by the computing device providing graphical user interface 800. A selection of the "Tags" option from pull-down menu 805 being provided by tab 803 may cause the computing device to generate the sets of rings and interconnection elements in a manner similar to that illustrated and described with respect to any of FIGS. 6A, 6B, 7, and/or 8. A selection of the "Workflows" option from pull-down menu 805 being provided by tab 803 may cause the computing device to generate a display within main display area 703 having a tabular format, with data included in the tabular format arranged in rows and columns, for example in a manner illustrated and described below with respect to FIGS. 11-13.

As part of the graphical user interface 800 included in main display area 703 associated with tabs 802 and 803, policy information 810 may also be generated and displayed. Policy information 810 may include one or more boxes that display graphical symbols, text boxes, and/or other information related to the particular policy that is currently selected for display by the information and graphical depictions included in graphical user interface being provided as user interface 800.

Figure 9:
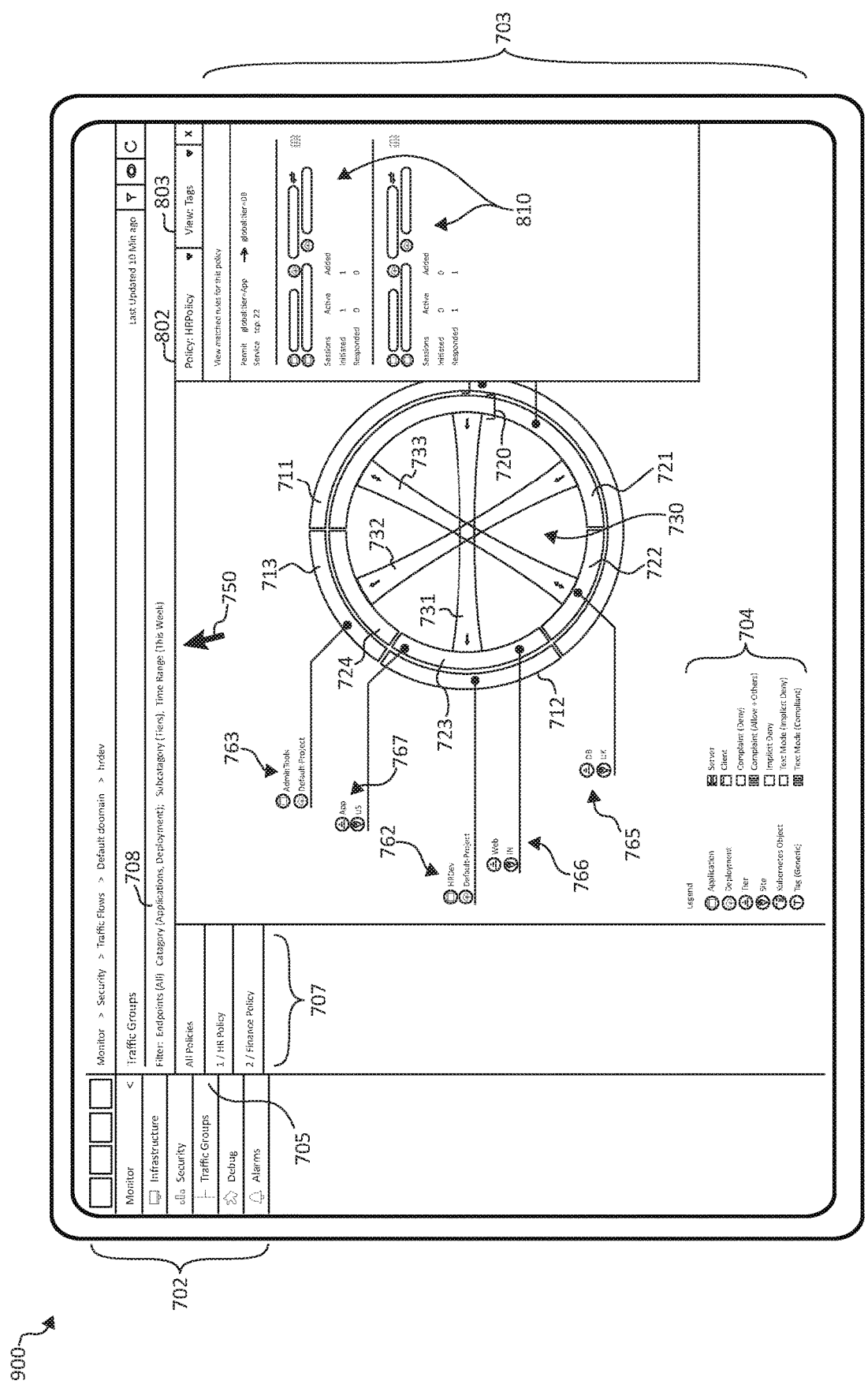
FIG. 9 illustrates an example graphical user interface output by a computing device that presents a graphical view of policy objects in a computer network, in accordance with one or more aspects of the present disclosure.

FIG. 9 illustrates an example graphical user interface 900 output by a computing device that presents a graphical view of policy objects in a computer network, in accordance with one or more aspects of the present disclosure. The illustration of user interface 900 includes features that remain the same or similar to corresponding features illustrated and described with respect to graphical user interface 700 and FIG. 7 and/or graphical user interface 800 and FIG. 8. These corresponding features as shown in FIG. 9 in conjunction with user interface 900 retain the same reference numbers, and may provide the same or similar features, and perform the same or similar functions as was described above with respect to graphical user interfaces 700 and 800. Such corresponding features may include information section 702, main display area 703 including segments arranged in outer ring 710 and in inner ring 720, and legend 704, tabs 802 and 803, and policy information 810. Examples of differences between user interface 900 of FIG. 9 and graphical user interfaces 700 and 800 as illustrated and described with respect to FIGS. 7 and 8, respectively, are further described below.

Graphical user interface 900 as shown in FIG. 9 may be generated in response to the selection of the "HR Policy" option provided in the policy list 805 illustrated and described with respect to graphical user interface 800 and FIG. 8. In other words, graphical user interface 900 as shown in FIG. 9 may be generated by the computing device generating the graphical user interfaces depicted in FIGS. 7-9 based on the selection of the "HR Policy" as the policy and associated workloads/policy objects to be depicted within main display area 703 as the current graphical user interface provided as graphical user interface 900. Graphical user interface 900 includes a display of segments 711, 712, 713, 721, 722, 723, and 724, along with interconnection elements 731, 732, and 733 that are representative of workloads and/or policy objects and communications between or configured to occur between these workloads and/or policy objects associated with the application(s) for the selected "HR Policy." Graphical user interface 900 may also include the policy information 810, as described above, or some variation thereof, generated and displayed within main display area 703.

Figure 10:
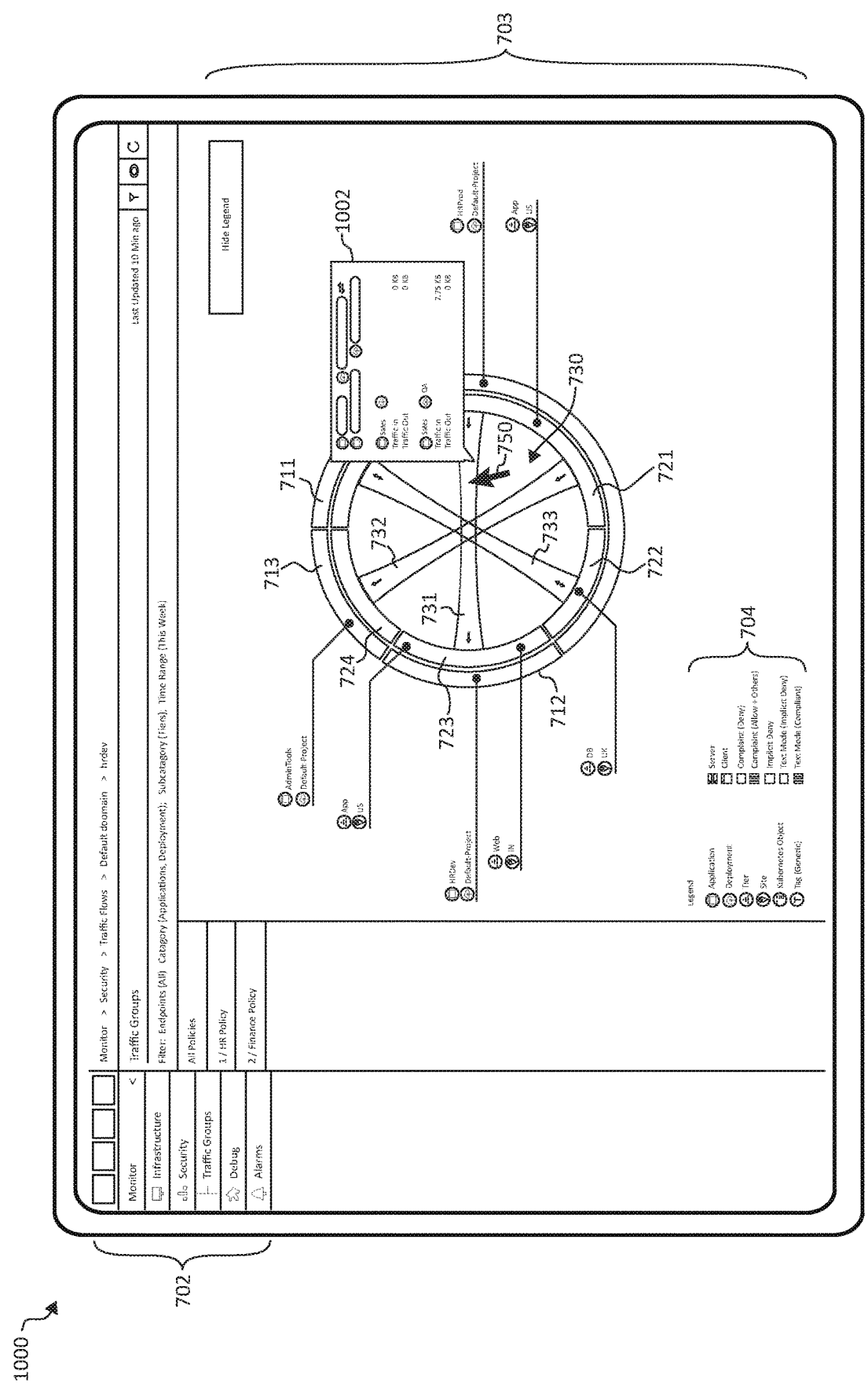
FIG. 10 illustrates an example graphical user interface output by a computing device that presents a graphical view of policy objects in a computer network, in accordance with one or more aspects of the present disclosure.

FIG. 10 illustrates an example graphical user interface 1000 output by a computing device that presents a graphical view of policy objects in a computer network, in accordance with one or more aspects of the present disclosure. The illustration of user interface 1000 includes features that remain the same or similar to corresponding features illustrated and described with respect to user interface 700 and FIG. 7. These corresponding features as shown in FIG. 10 in conjunction with user interface 1000 retain the same reference numbers, and may provide the same or similar features, and perform the same or similar functions as was described above with respect to user interface 700. Such corresponding features may include information section 702, main display area 703 including segments arranged in outer ring 710 and in inner ring 720, and legend 704. Examples of differences between user interface 700 of FIG. 7 and user interface 1000 as illustrated and described with respect to FIG. 10 are further described below.

As shown in FIG. 10, the interconnection elements 731, 732, and 733 may be selectable graphical elements, which are selectable based on user inputs provided to the computing device generating graphical user interface 1000. For example, user inputs to the computing device may be made by a cursor, such as cursor 750, indicating a selection of one of the interconnection elements 731, 732, 733. An illustrative example of such a selection is shown in FIG. 8 showing the positioning of cursor 750 over some portion of the interconnection element 731, and receiving an indication of a further input, such as a mouse "click" made at a computer input device such as a computer mouse (not shown in FIG. 8) to indicate the selection of interconnection element 731. In response to receipt of input(s) indicating the selection of interconnection element 731, the computing device generating graphical user interface 1000 may generate and provide as an output for display a pop-up box 1002, as illustratively shown in FIG. 8.

Pop-up box 1002 may include a pointer 1003 that extends from the boarder provided around the pop-up box, wherein pointer 1003 "points" to, e.g., terminates in an angular point, within the area included in interconnection element 731 to indicate that the contents included within the pop-up box is associated with the interconnection element pointed to by pointer 1003. The contents included within pop-up box 1002 is not limited to any particular format or type of content, and may include graphical symbols, text boxes, and/or text that illustrates information associated with the communications occurring or configured to occur associated with the workloads and/or policy objects coupled by the selected interconnection element (e.g., interconnection element 731 in the example illustrated in FIG. 8). As shown, pop-up box 1002 includes graphic symbols representing tags that have been assigned to the workloads and/or policy objects represented by the segments in the inner ring 720 coupled by interconnection element 731. Text boxes located adjacent to each graphic symbol provided within pop-up box 1002 may include text that indicates the tag name or tag value associated with the tag or tags being represented by the information included within the pop-up box. The content of pop-up box 1002 may be pre-defined, and/or may include additional selectable portions that may be selected and/or editable based on additional user inputs provided to the computing device generating user interface 1000.

In various examples, any of the interconnection elements being displayed as part of a graphical user interface as described in this disclosure, or any equivalents thereof, may also be configured as selectable graphical elements, and when selected, may cause the computing device that is generating the user interface to generate and provide as an output for display a pop-up box having content associated with the workload, policy object, or communication being represented in the graphical user interface by the selected graphical element. For example, a similar selectable function may also be providing that allows selection of any of the segments, such as segments 711, 712, 713, 721, 722, 723, and 724 being displayed as part of a graphical user interface such as graphical user interface 1000. Upon receiving an input indicative of a selection of a segment, the computing device generating the graphical user interface may generate and provide as an output for display information, for example in the form of a pop-up box, information related to the selected segment. The provided pop-up box may also include an indicator, similar to pointer 1003, the provides a visual indication of the selected graphical element, such the selected segment, that the information being provided within the pop-up box is associated with.

Figure 11:
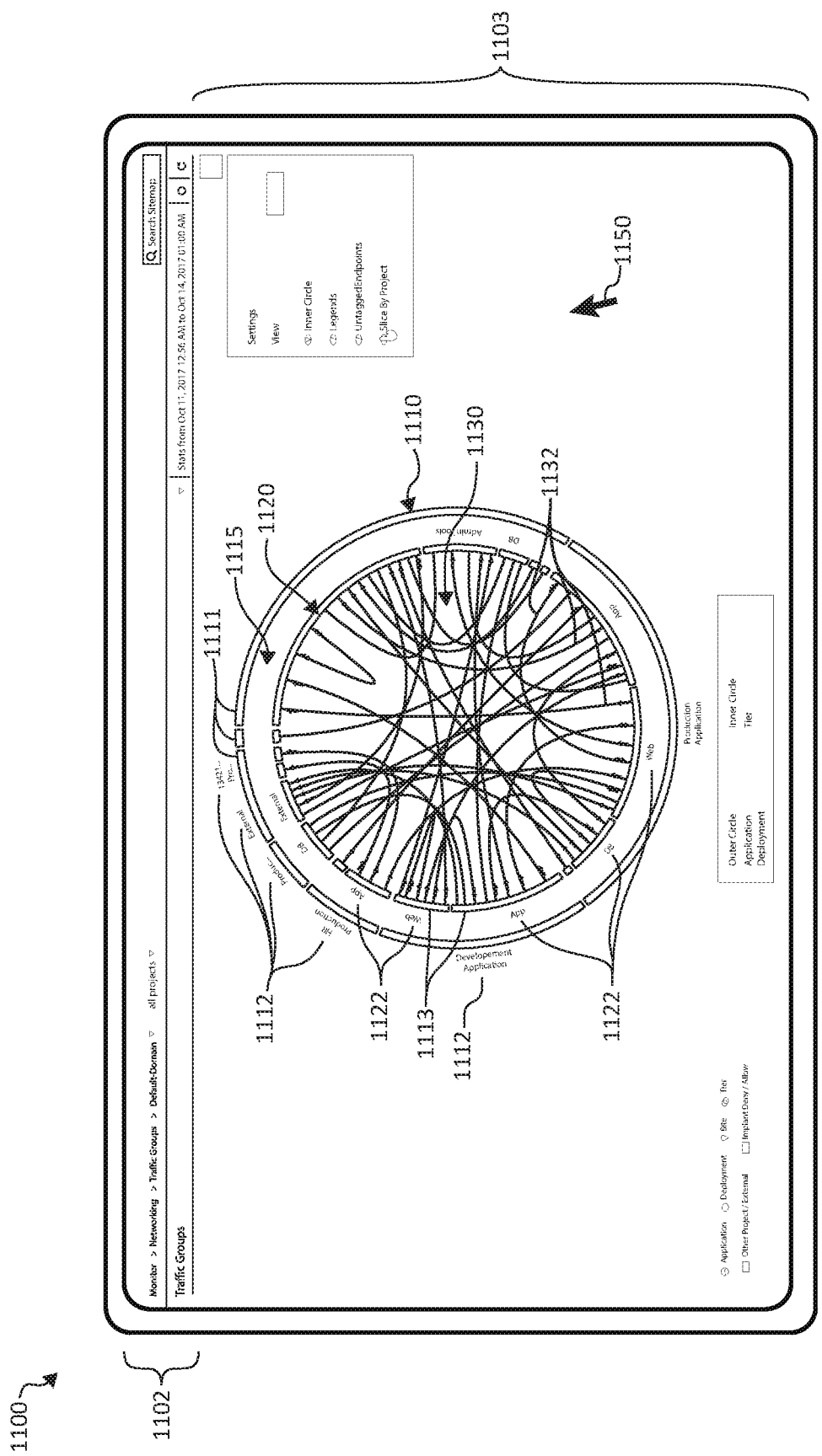
FIG. 11 illustrates another example graphical user interface output by a computing device that presents a graphical view including segments representing workloads and communications between workload, in accordance with one or more aspects of the present disclosure.

FIG. 11 illustrates another example graphical user interface 1100 output by a computing device that presents a graphical view of policy objects in a computer network, in accordance with one or more aspects of the present disclosure. Graphical user interface 1100 may be generated by a computing device as part of dashboard 203 (FIG. 1) using a user interface having a similar layout and arrangement of graphical elements as described above for example with respect to user interface 600 and FIG. 6A. As shown in FIG. 11, graphical user interface 1100 includes one or more information sections (hereinafter "information section 1102"), generally indicated as begin to the right of bracket 1102 in FIG. 11. Graphical user interface 1100 also includes a main display area (hereinafter "main display area 1103"), generally indicated as being located to the left of bracket 1103 in FIG. 11. Portions or all of the graphical elements included in the information section 1102 may extend across the top portion of graphical user interface 1100 and be located above, at least in part, the main display area 1103. One or more portions of information section 1102 may include selectable graphical elements or selectable menus, such as pull-down menus, that may be selected and/or have content associated with that portion of the graphical user interface that may be selected and/or amended based for example on user inputs received by the computing device generating user interface 1100.

For example, a cursor such as cursor 1150 may be manipulated by user inputs provided to the computing device generating user interface 1100 to position the cursor over graphical elements located within information section 1102, and/or to indicate a selection of one or more of the graphical elements being provided as part of the images displayed within main display area 1103. Other portions of information section 1102 and/or main display area 1103 may provide information, for example in the form of text and/or graphical symbols, that are indicative of one or more parameter or other aspects of the information being provided within main display area 1103.

As shown in FIG. 11, graphical user interface 1100 includes a plurality of arc or semi-circular shaped segments, examples of which are indicated by reference numbers 1111 in FIG. 11, and which are arranged to form outer ring 1110 in a manner similar to that described above with respect to outer ring 710 and FIG. 7. Graphical user interface 1100 as shown in FIG. 11 also includes a plurality of arc or semi-circular shaped segments, examples of which are indicated by reference numbers 1113 in FIG. 11, and which are arranged to form inner ring 1120 in a manner similar to that described above with respect to inner ring 720 and FIG. 7. Outer ring 1110 encircles inner ring 1120 in FIG. 11, and both outer ring 1110 and inner ring 1120 encircle an interior area 1130 in a manner similar to that described above with respect to interior area 730 and FIG. 7. A plurality in interconnection elements, examples of which are generally indicated by reference numbers 1132 in FIG. 11, are shown as extending across portions of interior area 1130, each interconnection element coupling a pair of the segments positioned within inner ring 1120 in a manner similar to that described above with respect to interconnection elements 731, 732, and 733 and FIG. 7. The graphical elements shown as the segments in outer ring 1110 and inner ring 1120 in FIG. 11 depict workloads and or policy objects that may be assigned one or more tags to each respective segment. These segments may be selectable when displayed within graphical user interface 1100 to provide display of additional information associated with the selected segment in a manner similar to that described above for segments in other examples of graphical user interfaces described in this disclosure. In addition, the interconnection elements (examples represented by referenced numbers 1132) may also be selectable graphical elements, that when selected, may cause the computing device generating user interface 1100 to generate and display additional information, such as a pop-up box, that includes additional information associated with the communications being represented by the selected interconnection element.

Differences between user interface 1100 as shown in FIG. 11 and the examples of user interfaces as shown in FIGS. 7-10 may include use of a wider space, generally indicated by arrow 1115, between outer ring 1110 and inner ring 1120 in user interface 1100, and the addition of labels, such as text, positioned adjacent to one or more of the segments located within the outer ring 1110 and/or inner ring 1120. Examples of the text associated with segments located in outer ring 1110 are indicated by reference numbers 1112 in FIG. 11. The text associate with the respective segments may include a tag name or tag value, or a plurality of tag names or tag values, assigned to the workload or the policy object adjacent to where the respective text is located. In the example shown in FIG. 11, the text labels associated with segments located within the outer ring 1110 are positioned outside the area encircled by the outer ring, and adjacent to the respective segment that the text labels are respectively associated with.

Examples of the text associated with segments located in inner ring 1120 are indicated by reference numbers 1122 in FIG. 11. The text associate with the respective segments of inner ring 1120 may include a tag name or tag value, or a plurality of tag names or tag values, assigned to the workload or the policy object adjacent to where the respective text is located. In the example shown in FIG. 11, the text labels associated with segments located within the inner ring 1120 are positioned within the space indicated by arrow 11 between the inner ring 1120 and the outer ring 1110, and adjacent to the respective segment in the inner ring 1120 that the text labels are respectively associated with.

Figure 12:
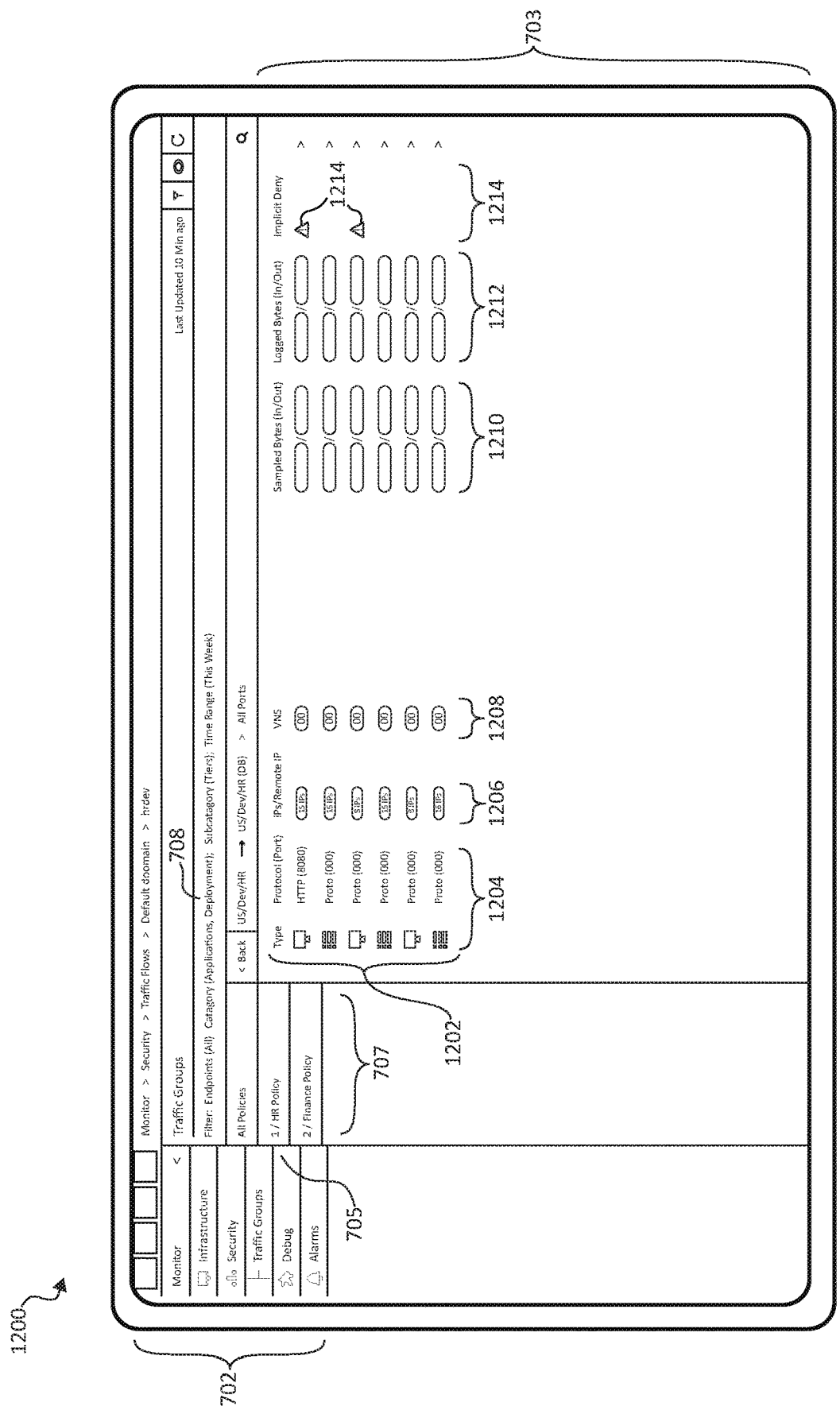
FIG. 12 illustrates an example graphical user interface output by a computing device that presents a graphical view of policy objects in a computer network, in accordance with one or more aspects of the present disclosure.

FIG. 12 illustrates an example graphical user interface 1200 output by a computing device that presents a graphical view of policy objects in a computer network, in accordance with one or more aspects of the present disclosure. The illustration of user interface 1200 includes features that remain the same or are similar to corresponding features illustrated and described with respect to user interface 700 and FIG. 7. These corresponding features as shown in FIG. 12 in conjunction with user interface 1200 retain the same reference numbers, and may provide the same or similar features, and perform the same or similar functions as was described above with respect to user interface 700. Such corresponding features may include information section 702 and main display area 703. Examples of differences between user interface 700 of FIG. 7 and user interface 1200 as illustrated and described with respect to FIG. 12 are further described below.

In contrast to user interface 700 shown in FIG. 7 that includes the graphical depiction of workload and/or policy objects as arc or semi-circular shaped segments, main display area 703 of graphical user interface 1200 as shown in FIG. 12 includes information presented in a tabular format. As shown in FIG. 12, main display area 703 includes a display including graphical symbols, text boxes and associated text, arranged in a plurality of rows and columns. The rows are generally indicated by the rows positioned to the right side of bracket 1202 (hereinafter "rows 1202) in FIG. 12. The rows 1202 are organized into columns spaced long the rows, from left to right in FIG. 12, and depicted as columns 1202, 1204, 1206, 1208, 1210, 1212, and 1214. Each of the columns includes a particular type of information, which may be displayed as a graphic symbol, a text box with or without text, or some combination thereof, associated with the particular row of rows 1202 where the information is positioned.

For example, columns 1204 includes a graphical symbol and text assigned to a protocol for a respective port represented by the row of rows 1202 where the individual graphical symbol and associated text are located. Moving to the right in FIG. 12, columns 1204 illustrated d text box and text including a number value indicative of a value for the IPs/remote IPs for each corresponding row. Column 1208 includes a text box including text indicative of the number of virtual networks (VNs) associated with the port for the corresponding row where the information is positioned.

Column 1210 and 1212 include fillable text boxes that may be used to provide additional information related to Sampled Bytes and Logged Bytes, respectively, for each of the rows included in rows 1202. Column 1214 may include information, such as graphical symbols (e.g., graphical symbols indicated by reference numbers 1214), indicative of the communication permission settings assigned to the respective ports associated with each of rows 1212. One or more portions of the display being provided by graphical user interface 1200 may be selectable based for example on user inputs received by the computing device generating user interface 1200. Receipt of an indication of such a selection may result in the computing device generating user interface 1200 to regenerate the graphical user interface being displayed to provide more detailed and/or different information as part of graphical user interface 1200, as further illustrated and descried below with respect to FIGS. 13 and 14.

Figure 13:
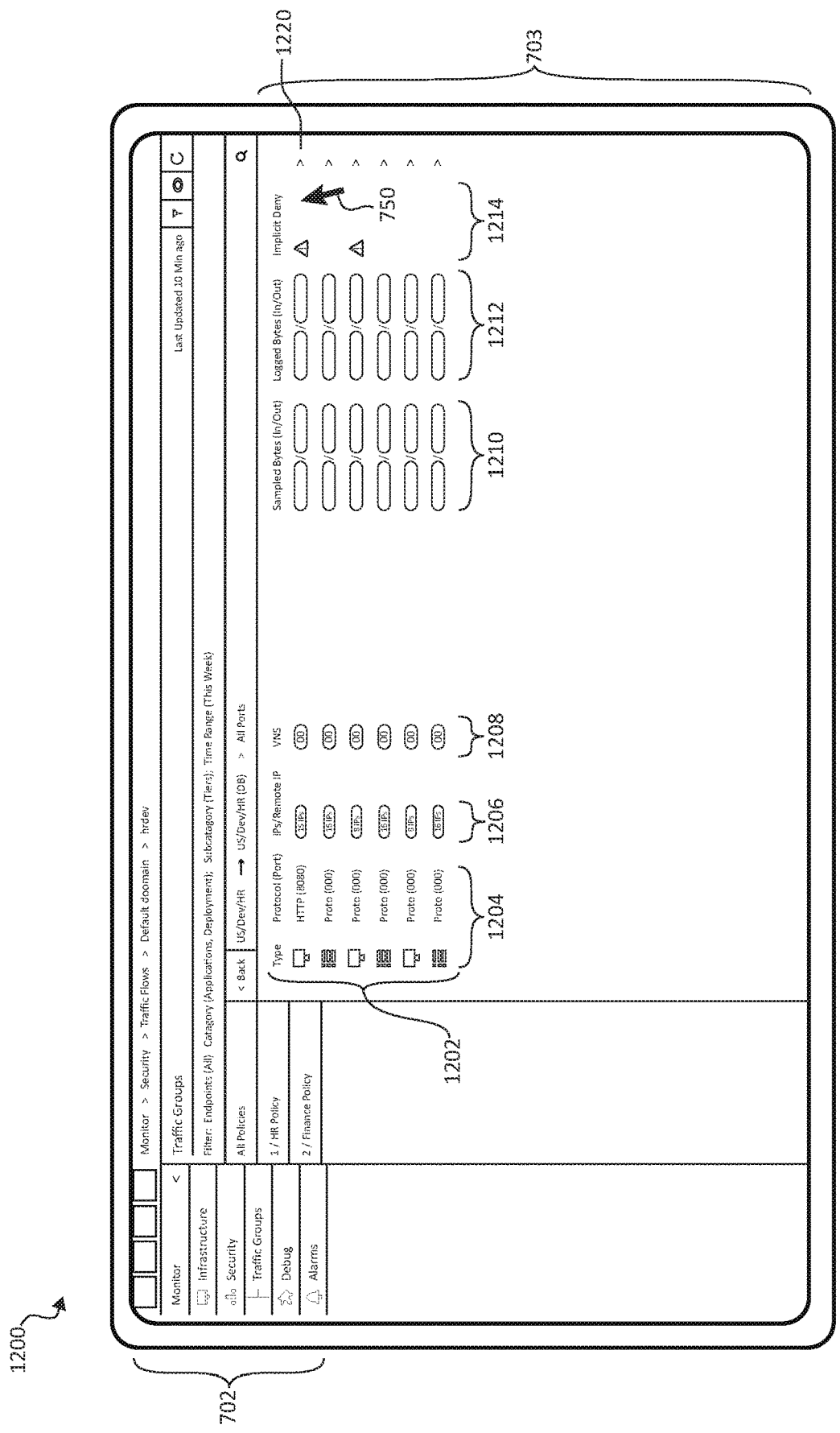
FIG. 13 illustrates an example graphical user interface output by a computing device that illustrates a selection of information related to workloads as illustrated in FIG. 12.

FIG. 13 illustrates an example of the graphical user interface 1200 as shown in FIG. 12. The example of graphical user interface 1200 as shown in FIG. 13 includes a cursor 750 positioned over a portion of the top row of rows 1202 within main display area 703. The top row in user interface corresponds to a port named "HTTP 880," and includes information associated with that particular port. In indication of a selection of the top row, for examples based on inputs provided through actuation of cursor 750, may cause the computing device generating graphical user interface 1200 to regenerate the graphical user interface to display more detailed information related to the "HTTP 880" port as illustrated for example in FIG. 14.

Figure 14:
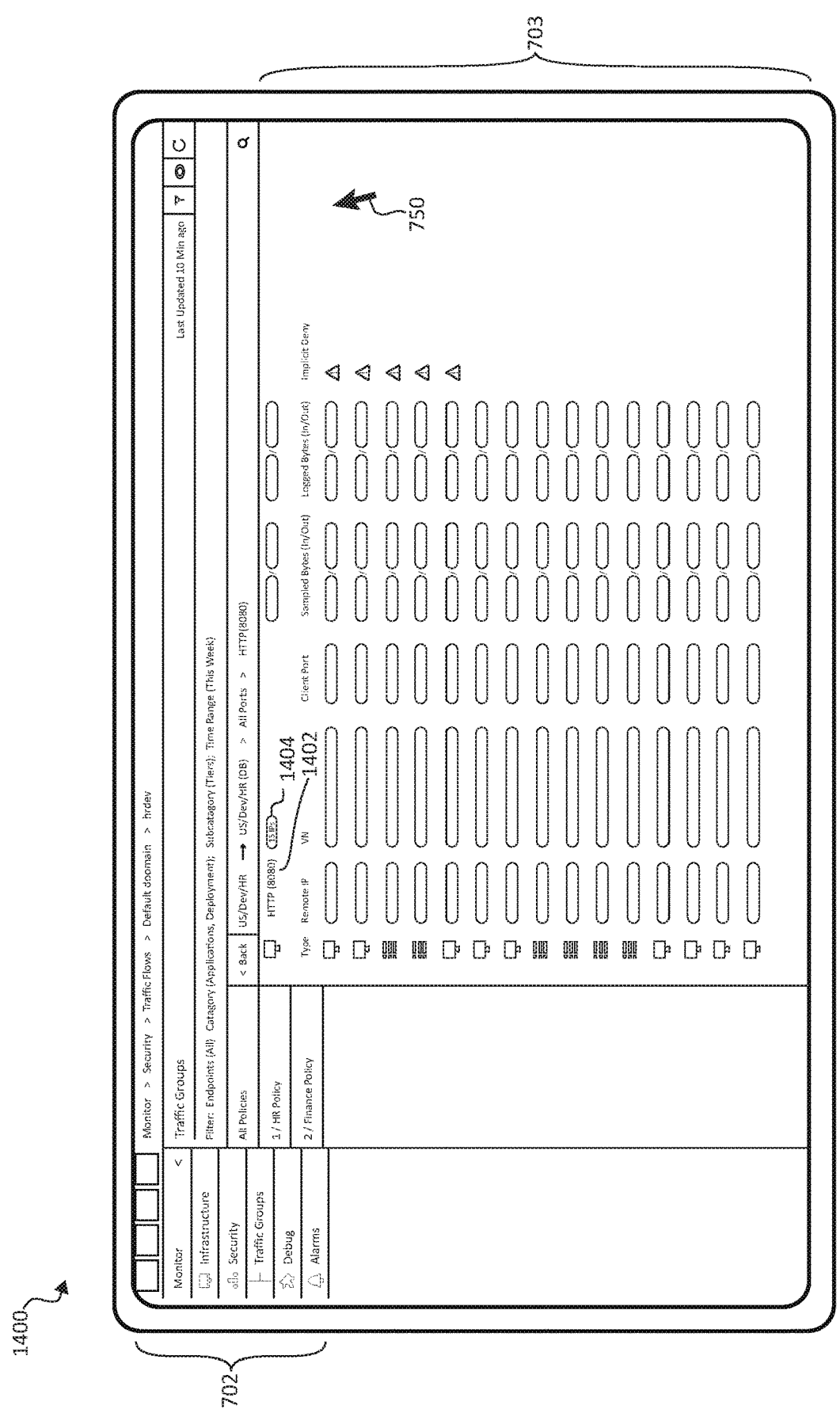
FIG. 14 illustrates an example graphical user interface output by a computing device that presents a detailed view information regarding workloads and communications between workload based on the selection illustrated in FIG. 13.

As show in FIG. 14, a new graphical user interface 1400 is generated for display in response to an indication of the selectin of the top row in the graphical user interface 1200 of FIGS. 12 and 13. As illustrated in FIG. 14, graphical user interface 1400 includes a label 1402 indicating that the information displayed in main display area 703 is associated with the "HTTP 880" port. A current value for the IPs measured for the port may be displayed in a text box 1404 positioned next to label 1402. The information included in the rows and columns of graphical informant displayed within main display area 703 as graphical user interface 1400 is example of information associated with the selected "HTTP 880" port indicate by the name provided with label 1404 that may be displayed in response to the selection of the top rows of rows 1202.

Thus, the selection of the top row in the main display area 703 of user interface 1200 (FIGS. 12, 13) may be used to have the computing device generating the graphical user interface to regenerate a new graphical user interface, such as graphical user interface 1400, which includes a more detailed level of information associated with selected item, such as the port, being depicted by the information being displayed in graphical user interface 1400 as shown in FIG. 14. It would be understood for example any row within the rows 1202 of user interface 1200 may be selected based on inputs received by the computing device generating the graphical user interfaces to cause the computing device to regenerate a new graphical user interface that includes more detailed information related to the selected row, and is not limited to a selection of the top row of the rows 1202 of graphical user interface 1200.

Figure 15:
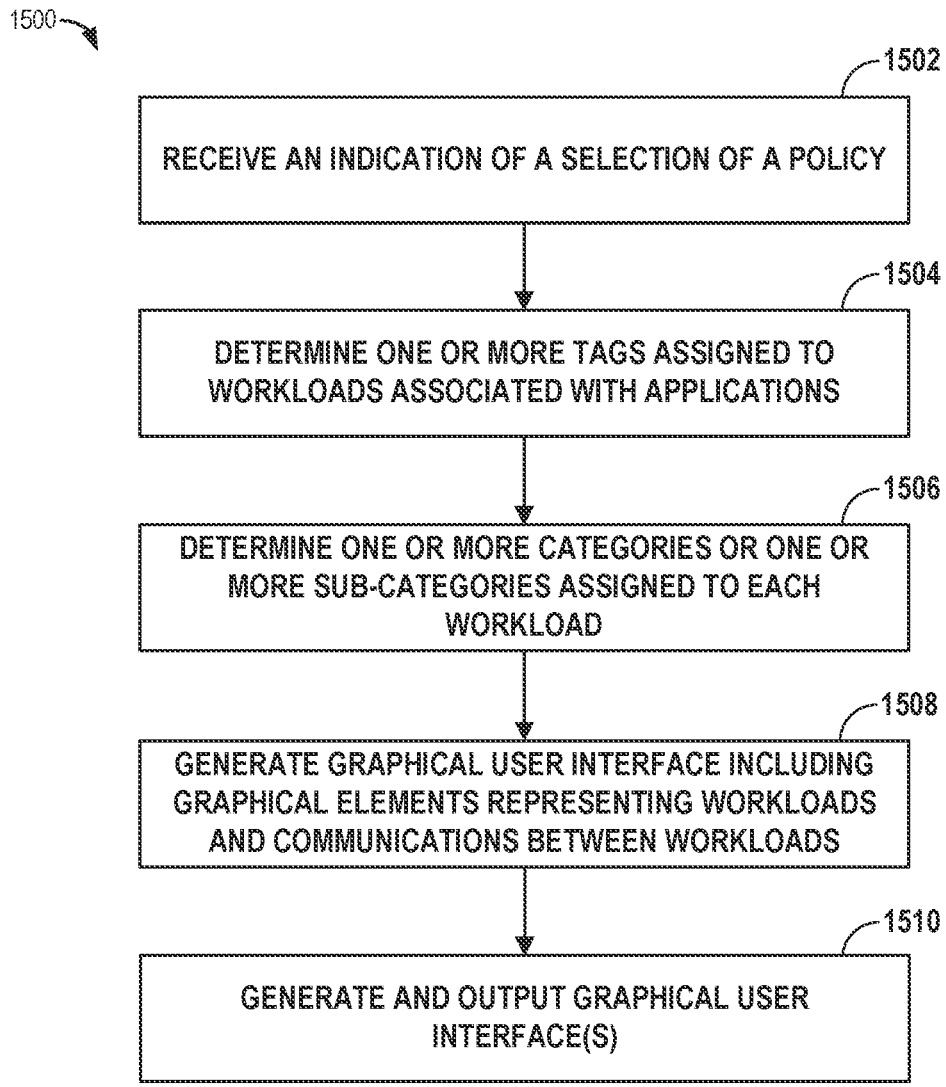
FIG. 15 illustrates a method for generating graphical user interfaces for displaying information depicting workloads and communications between workload operating within a computer network, in accordance with one or more aspects of the present disclosure.

FIG. 15 illustrates a method 1500 for generating graphical user interfaces for displaying information depicting workloads and communications between workload operating within a computer network, according to one or more aspects of the present disclosure. Method 1500 is described as being performed, at least in part, by controller 23 and dashboard 203 as illustrated and described with respect to FIGS. 1-5. However, examples of method 1500 are not limited to being performed in whole or in part by controller 23. Method 1500 may be performed by any processing circuitry of a computing device and/or by any processing circuitry, for example processing circuitry located in one or more of a plurality of servers coupled to a computer network system, such as computer network system 8 as illustrated and described with respect to FIG. 1.

Method 1500 is some examples includes controller 23 receiving an indication of a selection of a policy (block 1502). An indication of a selection of a policy may be based on user inputs provided a selection of a policy from a list of available policies, such as policy list 804 as illustrated and described with respect to FIG. 8. Examples of a policy may include one or more applications associated with "HR Policy," a "Finance Policy," a "Sales Policy," or any other available policies.

Method 1500 in some examples includes controller 23 determining a set of one or more tags assigned to workloads associated with an application or applications to be executed based at least in part on the selection of a policy (block 1504). In some examples, a workload may be assigned a plurality of tags, each tag associated with a category or a sub-category predefined for each of the tags as described in this disclosure. In some examples, tags may be pre-defined to include multiple tiers of tags including one or more tags defined as belonging to a category or categories of tags, and one or more tags defined as belonging to a sub-category or sub-categories of tags. Categories and/or sub-categories of tags may also include custom and/or user defined tags.

In some examples, one category or sub-category of tags may include an "Application" tag indicative of an application a workload is generated from by based on the execution of the particular application. In some examples, one category or sub-category of tags may include a "Site" tag indicative of the location, such as a physical location site, where the workload is running. In some examples, one category or sub-category of tags may include a "Deployment" tag indicative of an operational mode a workload is executing under, such as a developmental, staging, or a released mode. In some examples, one category or sub-category of tags may include a "Tier" tag indicative of an application tier job that a workload is performing, such as a web, tier, database.

Method 1500 in some examples includes controller 23 determining one or more categories or one or more sub-category assigned to each of the one or more tags assigned to each workload (block 1506). In some example, for each workload assigned at least one tag, controller 23 determines a category or a sub-category that each tag is pre-defined to belong to.

Method 1500 in some examples includes controller 23 generating a graphical user interface including graphical elements representing workloads and communications between the workloads (block 1508). In the graphical user interface, each of the workloads assigned a tag that is assigned to a category of the one or more categories is represented in a set of graphical elements arranged to form an outer ring, and each of the workloads assigned a tag that is assigned to a sub-category of the one or more sub-categories is represented in a set of graphical elements arranged in at least one inner ring. In some examples, the outer ring encircles the at least one inner ring, and one or more interconnection elements extending between the graphical elements. The one or more interconnection elements are representative of communications occurring or configured to occur between two or more of the workloads represented by the graphical elements.

In some example of the graphical user interface generated by controller 23, each of the graphical elements included in the outer ring is formed as a semi-circular shaped segment having a first thickness, a first end, and a second end, the first and second end of each graphical segment arranged adjacent to a first or second end of another graphical segment, the graphical elements in the outer ring arranged to encircle an interior area of the graphical user interface. In some example of the graphical user interface generated by controller 23, each of the graphic elements included in the at least one inner ring is formed as a semi-circular shaped segment having a second thickness different for the first thickness, a third end, and a fourth end, the third end and the forth end of each graphic segment arranged adjacent to the third end or the fourth end of another graphical segment including within the at least one inner ring, the graphical elements included within the at least one inner ring arranged to encircle a portion of the interior area of the graphical user interface.

In some example of the graphical user interface generated by controller 23, each of the graphical elements included in the outer ring is separated from a set of two adjacent graphical elements included within the outer ring by a first gap and a second gap, respectively. In some example of the graphical user interface generated by controller 23, each of the graphical elements included within the at least one inner ring is separated from a set of two adjacent graphical elements included within the inner ring by a third gap and a fourth gap, respectively, and each of the graphical segments included within the at least one inner ring is rotationally positioned adjacent to one of the graphical segments included within the outer ring, the adjacent graphical segment included within the outer ring corresponding to a policy object associated with a category that the workload represented by the graphical element within the at least one inner ring is assigned to.

In some examples, controller 23 is further configured to receive an indication of a selection of one of the graphical elements representing one of the workloads displayed in the graphical user interface, and in response to receiving the indication of the selection of one of the graphical elements, generating a pop-up text box for display as part of the graphical user interface, the pop-up text box comprising graphical information related to the workload associated with the selected graphical element. In some examples, controller 23 is further configured to receive an indication of a selection of one of the interconnection elements, and in response to receiving the indication of the selection of one of the interconnection elements, generating a pop-up text box for display as part of the graphical user interface, the pop-up text box comprising graphical information related to the communications occurring or configured to occur between the workload represented by the graphical elements that are coupled by the selected interconnection element.

In some examples, each of the graphical elements located in the outer ring of a graphical user interface generated by controller 23 is rendered for display using a color that is different from a color used to render any other one of the graphical elements included in the outer ring. In some examples of a graphical user interface generated by controller 23, the at least one inner ring comprises a first inner ring and a second inner ring, the first inner ring including graphical elements representing workloads of the plurality of workloads having at least one tag assigned to a first sub-category of the one or more sub-categories, and the second inner ring including graphical elements representing workloads of the plurality of workloads having at least one tag assigned to a second sub-category of the one or more sub-categories of tags that is also defined as a sub-category of the first sub-category. In some examples of user interfaces generated by controller 23, the one or more categories comprises an application category defining an application that each respective workload of the plurality of workloads is generated in response to the execution of, and wherein a tag name assigned to each of the workloads of the one or more workloads defines the particular application that the workload is generated in response to the execution of.

Method 1500 in some examples includes controller 23 outputting the graphical user interface for display at a display device (block 1510), such as user interface device 129 (FIG. 1). Display of the user interfaces in method 1500 may include controller 23 receiving inputs, for example by inputs provided by administrator 24 provided to user interface device 129, to modify the user interface being displayed according to any of the techniques described herein, or any equivalents thereof. User inputs may include any of the inputs to a user interface described throughout this disclosure, including user inputs to select what level of detail and/or which statuses for a particular workload are to be displayed, and a request for additional details, including details illustrated as a pop-up box (e.g., pop-up box 1002, FIG. 10) to be displayed for a particular status block. User inputs received by controller 23 may cause controller 23 to regenerate a graphical user interface based on a selection of a policy that is different from the policy that is currently selected for the generation of workloads associated with the currently selected policy. User inputs received by controller 23 may cause controller 23 to change between a view including a "Tag" view depicting workloads and associated informant as graphical elements and a "Workflow" view depicting workflows and associated information in a tabular format, that may include two-dimensional grid having graphical symbols and/or text arranged in one or more rows and one or more columns. Examples of graphical user interfaces that may be generated and output for display by controller 23, or other processing circuitry, may include examples of graphic user interfaces the same as or similar to any of the examples described in this disclosure, or any equivalents thereof, and including any of the variations to these examples as described in this disclosure, or any equivalents thereof.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:
    processing circuitry having access to a storage device, the processing circuitry configured to:
    generate a graphical user interface that includes:
        a first set of graphical elements arranged to form an outer shape,
        a second set of graphical elements arranged to form an inner shape within a space substantially enclosed by the outer shape, and
        an interconnection element,
        wherein a first pair of graphical elements, comprising a graphical element selected from the first set of graphical elements and a graphical element selected from the second set of graphical elements, identifies a first set of workloads of a plurality of workloads executing on a virtualized computing infrastructure,
        wherein a second pair of graphical elements, comprising a graphical element selected from the first set of graphical elements and a graphical element selected from the second set of graphical elements, identifies a second, different set of workloads of the plurality of workloads, and
        wherein the interconnection element visually ties the first pair of graphical elements to the second pair of graphical elements to indicate that communications between the first set of workloads and the second set of workloads are permitted according to a policy; and output the graphical user interface for display at a display device.

2. The computing system of claim 1,
wherein each graphical element in the first set of graphical elements indicates a category from one or more categories, and
wherein each graphical element in the second set of graphical elements indicates a sub-category from one or more sub-categories.

3. The computing system of claim 2, wherein the one or more categories or the one or more sub-categories comprises an application category for identifying an application of each of the plurality of workloads.

4. The computing system of claim 2, wherein the one or more categories or the one or more sub-categories comprises one or more of a tier category, site category, or development category for identifying a tier, site, or development stage of each of the plurality of workloads.

5. The computing system of claim 1, wherein the processing circuitry is further configured to:
based on an indication of user input selecting the policy, obtain the policy; and
generate the interconnection element based on the policy, wherein the policy identifies the first set of workloads and the second set of workloads, and wherein the policy specifies a permissibility of communications between the first set of workloads and the second set of workloads.

6. The computing system of claim 1, wherein each graphical element of the first set of graphical elements arranged to form the outer shape is separated from a set of two adjacent graphical elements of the first set of graphical elements arranged to form the outer shape by a first gap and a second gap, respectively.

7. The computing system of claim 1, wherein each graphical element of the second set of graphical elements arranged to form the inner shape is separated from a set of two adjacent graphical elements from the second set of graphical elements arranged to form the inner shape by a third gap and a fourth gap, respectively.

8. The computing system of claim 1, wherein the processing circuitry is further configured to:
receive an indication of user input selecting one of the graphical elements from the first set of graphical elements or the second set of graphical elements representing one of the plurality of workloads; and
based on the user input, generate a pop-up box for display as part of the graphical user interface, the pop-up box displaying information related to the workload represented by the selected graphical element.

9. The computing system of claim 1, wherein the processing circuitry is further configured to:
receive an indication of user input selecting the interconnection element; and
based on the user input, generate a pop-up box for display as part of the graphical user interface, the pop-up box comprising displaying information related to the communications between the first set of workloads and the second set of workloads.

10. The computing system of claim 9, wherein the information comprises an amount of traffic from the first set of workloads to the second set of workloads.

11. The computing system of claim 1, wherein the processing circuitry is further configured to:

obtain one or more tags assigned to each workload of the plurality of workloads, wherein each of the one or more tags corresponds to a category or sub-category comprising one of an application, tier, site, or development stage,
wherein the workload of the first set of workloads have a common one or more tags assigned.

12. The computing system of claim 1, wherein the interconnection element is located within a space enclosed by the inner shape.

13. The computing system of claim 1, wherein each of the workloads comprises one of a virtual machine or a container.

14. A method comprising:
generating, by a computing system, a graphical user interface that includes:
a first set of graphical elements arranged to form an outer shape,
a second set of graphical elements arranged to form an inner shape within a space substantially enclosed by the outer shape, and
an interconnection element,
wherein a first pair of graphical elements, comprising a graphical element selected from the first set of graphical elements and a graphical element selected from the second set of graphical elements, identifies a first set of workloads of a plurality of workloads executing on a virtualized computing infrastructure,
wherein a second pair of graphical elements, comprising a graphical element selected from the first set of graphical elements and a graphical element selected from the second set of graphical elements, identifies a second, different set of workloads of the plurality of workloads, and
wherein the interconnection element visually ties the first pair of graphical elements to the second pair of graphical elements to indicate that communications between the first set of workloads and the second set of workloads are permitted according to a policy; and
outputting the graphical user interface for display at a display device.

15. The method of claim 14,
wherein each graphical element in the first set of graphical elements indicates a category from one or more categories, and
wherein each graphical element in the second set of graphical elements indicates a sub-category from one or more sub-categories.

16. The method of claim 15, wherein the one or more categories or the one or more sub-categories comprises an application category for identifying an application of each of the plurality of workloads.

17. The method of claim 15, wherein the one or more categories or the one or more sub-categories comprises one or more of a tier category, site category, or development category for identifying a tier, site, or development stage of each of the plurality of workloads.

18. The method of claim 14, further comprising:
obtaining one or more tags assigned to each workload of the plurality of workloads, wherein each of the one or more tags corresponds to a category or sub-category comprising one of an application, tier, site, or development stage,
wherein the first set of workloads have a common one or more tags assigned.

19. The method of claim 14, wherein each of the workloads comprises one of a virtual machine or a container.

20. Non-transitory computer readable media storing instructions that, when executed by a processing circuitry, cause a computing system to:
- generate a graphical user interface that includes:
  - a first set of graphical elements arranged to form an outer shape,
  - a second set of graphical elements arranged to form an inner shape within a space substantially enclosed by the outer shape, and
  - an interconnection element,
- wherein a first pair of graphical elements, comprising a graphical element selected from the first set of graphical elements and a graphical element selected from the second set of graphical elements, identifies a first set of workloads of a plurality of workloads executing on a virtualized computing infrastructure,
- wherein a second pair of graphical elements, comprising a graphical element selected from the first set of graphical elements and a graphical element selected from the second set of graphical elements, identifies a second, different set of workloads of the plurality of workloads, and
- wherein the interconnection element visually ties the first pair of graphical elements to the second pair of graphical elements to indicate that communications between the first set of workloads and the second set of workloads are permitted according to a policy; and
- output the graphical user interface for display at a display device.

* * * * *